US011204690B1

(12) United States Patent
Hoberman et al.

(10) Patent No.: US 11,204,690 B1
(45) Date of Patent: Dec. 21, 2021

(54) SYSTEMS AND METHODS FOR SOFTWARE DEVELOPMENT AND DEPLOYMENT PLATFORMS HAVING ADVANCED WORKFLOW AND EVENT PROCESSING CAPABILITIES AND GRAPHICAL VERSION CONTROLS

(71) Applicant: UNQORK, INC., New York, NY (US)

(72) Inventors: Gary Hoberman, Syosset, NY (US);
Bassam Chaptini, New York, NY (US);
Samuel Weaver, New York, NY (US);
Matthew Vella, Brooklyn, NY (US)

(73) Assignee: Unqork, Inc., New York, NY (US)

( * ) Notice: Subject to any disclaimer, the term of this patent is extended or adjusted under 35 U.S.C. 154(b) by 0 days.

(21) Appl. No.: 16/810,623

(22) Filed: Mar. 5, 2020

(51) Int. Cl.
*G06F 3/0486* (2013.01)
*G06F 3/0484* (2013.01)
*G06F 9/445* (2018.01)

(52) U.S. Cl.
CPC ...... *G06F 3/04842* (2013.01); *G06F 3/04845* (2013.01); *G06F 9/44536* (2013.01); *G06F 3/0486* (2013.01)

(58) Field of Classification Search
CPC .................................................. G06F 3/0482
See application file for complete search history.

(56) References Cited

U.S. PATENT DOCUMENTS 5,317,733 A  5/1994 Murdock
6,748,425 B1  6/2004 Duffy et al.
(Continued)

FOREIGN PATENT DOCUMENTS

EP  2913763 A1  2/2015

OTHER PUBLICATIONS

Aanensen et al., "EpiCollect+: linking smartphones to web applications for complex data collection projects" (Aug. 20, 2014) 23 pages.

(Continued)

*Primary Examiner* — Daniel Rodriguez
(74) *Attorney, Agent, or Firm* — Occhiuti & Rohlicek LLP

(57) ABSTRACT

This disclosure relates to an improved software development platform that enables the dynamic generation and deployment of advanced applications such as electronic forms and/or other applications. The platform includes graphical user interfaces that enable users to drag-and-drop or otherwise insert components into a development window to define the content, functionality, workflow, background processes, and other criteria for the electronic forms. The components may correspond to pre-defined or pre-packaged software bundles that can be integrated into the electronic forms to define input fields, design layouts, application functions, preconfigured templates, and background processes. After electronic forms are completed, options can be selected to deploy the forms in a cloud-based environment or in other ways. This disclosure is also related to improved software development and deployment platforms that provide version control components that are configured to perform various functions associated with managing, controlling, accessing, and/or comparing multiple versions of electronic forms and associated form components.

22 Claims, 26 Drawing Sheets

(56) References Cited

U.S. PATENT DOCUMENTS

| | | | |
|---|---|---|---|
| 7,168,035 B1* | 1/2007 | Bell | G06F 40/174 715/234 |
| 7,281,018 B1 | 10/2007 | Begun et al. | |
| 7,356,182 B1 | 4/2008 | Fleisher et al. | |
| 7,673,286 B2* | 3/2010 | Yuknewicz | G06F 8/38 717/113 |
| 7,712,022 B2 | 5/2010 | Smuga et al. | |
| 7,739,652 B2 | 6/2010 | Lake | |
| 7,827,478 B2 | 11/2010 | Farr et al. | |
| 8,402,004 B2 | 3/2013 | Provenzano et al. | |
| 8,479,109 B2 | 6/2013 | Washington et al. | |
| 8,589,357 B2 | 11/2013 | Radhakrishnan et al. | |
| 8,683,315 B2 | 3/2014 | Stover | |
| 8,734,139 B2 | 5/2014 | Burns et al. | |
| 8,751,464 B1* | 6/2014 | Weiss | G06Q 10/10 707/695 |
| 8,874,621 B1* | 10/2014 | Goodwin | G06F 16/211 707/803 |
| 8,898,629 B2 | 11/2014 | Hirsch et al. | |
| 8,918,729 B2 | 12/2014 | Fortini et al. | |
| 9,223,770 B1* | 12/2015 | Ledet | G06Q 30/0625 |
| 9,329,838 B2 | 5/2016 | Tattrie et al. | |
| 9,335,974 B2 | 5/2016 | Howard | |
| 9,569,406 B2 | 2/2017 | Shaver | |
| 9,851,953 B2 | 12/2017 | Straub et al. | |
| 10,048,946 B2 | 8/2018 | Krishnan et al. | |
| 10,185,703 B2 | 1/2019 | Abrahami | |
| 10,402,191 B1* | 9/2019 | Eapen | G06F 9/44536 |
| 10,764,318 B1* | 9/2020 | Neel | H04L 41/147 |
| 2002/0026339 A1* | 2/2002 | Frankland | G06Q 10/0631 705/7.12 |
| 2005/0065933 A1 | 3/2005 | Goering | |
| 2005/0066287 A1 | 3/2005 | Tattrie et al. | |
| 2006/0150148 A1 | 7/2006 | Beckett et al. | |
| 2006/0206866 A1* | 9/2006 | Eldrige | G06F 8/71 717/122 |
| 2007/0220486 A1 | 9/2007 | Lammel et al. | |
| 2007/0250769 A1* | 10/2007 | Bass | G06F 40/174 715/234 |
| 2007/0250783 A1* | 10/2007 | Wu | G06F 40/174 715/762 |
| 2008/0098291 A1 | 4/2008 | Bradley et al. | |
| 2008/0120538 A1 | 5/2008 | Kurz et al. | |
| 2008/0235579 A1* | 9/2008 | Champion | G06F 40/194 715/273 |
| 2009/0144698 A1 | 6/2009 | Fanning et al. | |
| 2009/0249237 A1* | 10/2009 | Jundt | G05B 19/0426 715/769 |
| 2009/0319921 A1* | 12/2009 | Abel | G06F 8/38 715/760 |
| 2010/0174974 A1* | 7/2010 | Brisebois | G06Q 10/00 715/223 |
| 2010/0312754 A1* | 12/2010 | Bear | G06F 16/134 707/685 |
| 2010/0318892 A1* | 12/2010 | Teevan | G06F 40/197 715/229 |
| 2010/0325601 A1 | 12/2010 | Turner et al. | |
| 2011/0276875 A1* | 11/2011 | McCabe | G06F 40/197 715/255 |
| 2012/0102386 A1* | 4/2012 | Campbell | G06F 16/2455 715/229 |
| 2012/0260232 A1* | 10/2012 | Hirsch | G06F 8/36 717/107 |
| 2013/0041677 A1 | 2/2013 | Nusimow et al. | |
| 2013/0097478 A1* | 4/2013 | Allison | G06F 40/174 715/222 |
| 2014/0033068 A1* | 1/2014 | Gupta | G06Q 10/103 715/751 |
| 2014/0033088 A1* | 1/2014 | Shaver | G06F 40/197 715/764 |
| 2014/0196011 A1 | 7/2014 | Bostick et al. | |
| 2014/0277743 A1 | 9/2014 | Hart et al. | |
| 2014/0344659 A1 | 11/2014 | Schnitt | |
| 2015/0032478 A1* | 1/2015 | Humpherys | G06Q 40/08 705/4 |
| 2015/0378573 A1* | 12/2015 | Jansen op de Haar | G06F 40/174 715/747 |
| 2016/0048487 A1* | 2/2016 | Briggs | G06F 40/197 715/229 |
| 2016/0062973 A1* | 3/2016 | Haines | G06F 40/174 715/224 |
| 2016/0132469 A1* | 5/2016 | Naveh | G06F 40/197 715/764 |
| 2016/0378439 A1* | 12/2016 | Straub | G06F 8/61 717/107 |
| 2018/0181378 A1 | 6/2018 | Bakman | |
| 2018/0225273 A1* | 8/2018 | White | G06F 3/0482 |
| 2018/0232216 A1* | 8/2018 | White | G06F 3/0486 |
| 2018/0239959 A1* | 8/2018 | Bui | G06F 40/103 |
| 2019/0318007 A1* | 10/2019 | Weaver | G06F 40/197 |
| 2020/0012709 A1* | 1/2020 | Kogler | G06F 40/177 |
| 2020/0097562 A1* | 3/2020 | Addala | G06F 16/214 |
| 2020/0341619 A1* | 10/2020 | Rogers | G06F 9/451 |

OTHER PUBLICATIONS

Aghaee et al., "Natural End-User Development of Web Mashups," Proceedings of IEEE Symposium on Visual Languages and Human-Centric Computing (Sep. 19, 2013) 8 pages.

Business Rules service introduced Decision Composer, Mar. 21, 2017, [retrieved Jul. 11, 2018]. Retrieved from the Internet <URL:https://www.ibm.com/blogs/bluemix/2017/03/business-rules-service-introduces-decision-composer/>.

Cardone et al., "Using Xforms to Simplify Web Programming," pp. 215-224 (May 14, 2005).

Form Builder [retrieved Jul. 11, 2018]. Retrieved from the Internet <URL:http://www.salesforceforms.com/features/form-builder>.

Ito et al., "A Visual Environment for Dynamic Web Application Composition" (Aug. 30, 2003) 10 pages.

Serverless Form-based Applications [retrieved Jul. 11, 2018]. Retrieved from the Internet <URL:https://form.io/#/>.

"Upgrade to SPSS Data Entry 2.0 Makes Designing Surveys, Data Collection Easier; Software Helps Business Collect Attitutde and Opinion Data to Improve Customer Relationships," Business Wire (Jun. 19, 2000) 6 pages.

* cited by examiner

Short Answer Component                                                400   ×

Display   Error Messages

Label ⓘ                                  Property Name ⓘ
Full Name                                fullName Placeholder ⓘ
PlaceholderText Input Mask ⓘ                             Regular Expression Pattern ⓘ
Input Mask                               Regular Expression Pattern Minimum Length ⓘ                         Maximum Length ⓘ
Minimum Length                           Maximum Length Prefix ⓘ                                 Suffix ⓘ
example '$', '@'                         example '$', '@'

Custom CCS Class ⓘ                       Description ⓘ
Custom CCS Class                         Description for this field.

Trigger ⓘ                                On Keypress ⓘ

☐ Hide Label ⓘ                           ☐ Hidden ⓘ
☐ Multiple Values ⓘ                      ☐ Disabled ⓘ
☑ Clear Value When Hidden ⓘ              ☑ Table View ⓘ
☐ Protected ⓘ                            ☐ Required ⓘ
☑ Persistent ⓘ
Field Tags ⓘ
Add a tag

[ SAVE ]                                 [ SAVE AS TEMPLATE ]

Date Input Component 700

Display  Error Messages

Label
Field Label

Property Name
dateinput2

Placeholder
Placeholder

Format
m for month, d for day, y or Y for year

☐ Disable user input

☐ Disable date picker

Restrict Date To Past/Future
None ▼

Number of years (+/-) from the current date to show in year dropdown
Defaults to 10 (+-10 years)

Trigger

Delimiter
Defaults to /

Field Tags
Add a tag

☐ Disabled
☐ Required

[SAVE]                [SAVE AS TEMPLATE]

FIG. 7

Decisions Component                                                                     800        ×
Micro Decision Label ⓘ                                    Property Name ⓘ            Property Type ⓘ
Decision Name                              decisionField              First
Trigger Type ⓘ                             Debounce Setting ⓘ
Watch                                ▼     m for month, d for day, y or Y for year
Inputs

| 810 id   | type  | requ | siler |
|----------|-------|------|-------|
| type     | exact | ☐    | ☐     |
| isUnique | exact | ☐    | ☐     |
|          |       | ☐    | ☐     |
|          |       | ☐    | ☐     |

Outputs

| 820 id    | type              |
|-----------|-------------------|
| canPatent | value             |
| canPatent | requiredAndVisible |

Micro Decisions  830

|   | type       | isUnique | marketSize_min | marketSize_max | canPatent_value | canPatent_requiredAndVisible |
|---|------------|----------|----------------|----------------|-----------------|------------------------------|
| 1 | Technology | yes      | 0              | 1000           | no              | yes                          |
| 2 | Technology | yes      | 1001           |                | yes             | yes                          |
| 3 | Biotech    | yes      |                |                | yes             | yes                          |
| 4 |            |          |                |                | no              | no                           |
| 5 |            |          |                |                |                 |                              |
| 6 |            |          |                |                |                 |                              |
| 7 |            |          |                |                |                 |                              |

Test Harness 840                                                        [EXECUTE]

|   | type       | isUnique | marketSize | canPatent_value | canPatent_value_result | canPatent_requireAndVisible | canPatent_requireAndVisible_result |
|---|------------|----------|------------|-----------------|------------------------|-----------------------------|------------------------------------|
| 1 | Technology | yes      | 500        | no              | no                     | yes                         | yes                                |
| 2 | Technology | yes      | 5000       | yes             | yes                    | yes                         | yes                                |
| 3 |            |          |            |                 |                        |                             |                                    |
| 4 |            |          |            |                 |                        |                             |                                    |
| 5 |            |          |            |                 |                        |                             |                                    |

☐ Disabled ⓘ                              ☐ Prevent execution while loading data ⓘ
☐ Persistent ⓘ                            ☐ Prevent navigation until complete ⓘ
Field Tags ⓘ                              ☐ Allow dot notation in names ⓘ
Add a tag

[SAVE] [CANCEL]                                              [SAVE AS TEMPLATE]

Initializer Component

Initializer | Permissions

Permission Types:
- Inherit: Inherit permissions from components that contain this component (e.g. panels, columns), then inherit from the form, then inherit from the role defaults
- No Access: No access to this field
- Obfuscate: Field will be delivered when requested, but it will be replaced with asterisks, and it cannot be written
- Read-Only: Field will be delivered when requested, but it cannot be written
- Write: Full access to this field

| Role | Permission | Effective Permission | Inherited From |
|---|---|---|---|
| Administrator | Inherit | Write | Role Defaults |
| ↳ Authenticated | Inherit | Write | Role Defaults |
| ↳ testRbacDecisionRole | Inherit | No Access | Role Defaults |
| ↳ Operations | From: "Read-Only" CHANGED —1520 | Write | Role Defaults |
| ↳ Compliance | Inherit | Write | Role Defaults |
| Manager | Inherit | Write | Role Defaults |
| ↳ Underwriter | Inherit | Read-Only | Role Defaults |
| ↳ Broker | Inherit | Read-Only | Form Defaults |
| underwriter | Inherit | No Access | Role Defaults |
| pauls-test | Inherit | Write | Role Defaults |
| NoAccess | Inherit | No Access | Role Defaults |
| my-role | Inherit | Read-Only | Role Defaults |
| read-only | Inherit | Read-Only | Role Defaults |

Cancel

Close

Restore this save and make it your current version?

This is about to become your current version. You won't lose any work by restoring and your notes will transfer over unless you edit them below.

Restoring

● Changes approved for UAT
Saved by mike@sample.com on May 24, 11:55 AM

Edit Restore Details  (Optional)

✏ Edit Name   (Restored) Changes approved for UAT

💬 Edit Name   Add some notes...

1820

You will be restoring changes to:

✓ Components
✓ Form Title and Path
✓ Form Settings

Some things won't change.

✗ Transforms
✗ Reference Data

1810

No, Don't Restore    Yes, Restore — 1830

FIG. 18

SYSTEMS AND METHODS FOR SOFTWARE DEVELOPMENT AND DEPLOYMENT PLATFORMS HAVING ADVANCED WORKFLOW AND EVENT PROCESSING CAPABILITIES AND GRAPHICAL VERSION CONTROLS

TECHNICAL FIELD

This disclosure is related to improved software development and deployment platforms that enable advanced applications including electronic forms to be generated and deployed in real-time using advanced workflow and event processing components to define and implement desired rules and to enrich data. This disclosure is also related to improved software development and deployment platforms that provide version control components that are configured to perform various functions associated with managing, controlling, accessing, and/or comparing multiple versions of electronic forms and associated form components. For example, in certain embodiments, the version control components can be configured to track changes across multiple versions of the electronic forms and/or form components, and visually display the changes and histories associated with the electronic forms and/or form components.

BACKGROUND

Modern technologies and techniques used to create and customize enterprise software applications suffer from certain drawbacks. Such applications often collect and present information and data at least in part using user-facing interfaces, and process the data using back-end systems. However, the underlying configuration of the components that handle these different aspects is often disjointed, thus hindering efficient and effective development and deployment of software applications. For example, current techniques typically separate the underlying rules governing the logic for processing data from client-side components that are accessed by the end-users. Defining software applications in this fashion is time-consuming and inefficient due, at least in part, to the resources required to complete development, integrate the applications into the back-end systems, and perform ongoing maintenance of the software. This problem is compounded in situations in which many different software applications are offered or deployed.

For example, electronic forms are used by software applications (e.g., web applications and/or client-side software applications) to collect data in various scenarios. In many cases, individuals or companies may desire advanced functionality (e.g., advanced control over event handling, workflow, and/or navigation) to be incorporated into the electronic forms. However, conventional techniques for creating advanced electronic forms are plagued by the challenges discussed above. That is, conventional techniques for creating advanced electronic forms typically require different skilled users with advanced programming knowledge to separately design an interface layer to collect the data, a logic layer to specify rules for the electronic form, and a storage layer to store data associated with the electronic forms. These layers are often designed by separate software development teams who need to ensure that the three layers are properly synced with one another. In many cases, additional problems can arise in situations where the electronic forms need to be integrated into existing systems (e.g., back-end computing platforms for a company or enterprise). Because the creation and integration of software and advanced electronic forms can be resource-intensive and extremely time-consuming, this prevents companies or enterprises from rapidly launching new customized and well-defined products and/or services.

While certain conventional solutions may exist which enable non-technical users to create electronic forms to a limited extent, these solutions do not allow advanced functionality and rules definition to be incorporated into the electronic forms. Instead, these solutions merely allow such users to create basic forms with minimal customization and are often of limited utility for companies or enterprises that desire electronic forms with enhanced features. These conventional solutions also typically provide no means to deploy the electronic forms and/or to integrate the electronic forms into existing systems or computing platforms. Similar problems arise in a broader context of applications other than electronic forms as well.

Solutions for creating electronic applications, such as electronic forms with enhanced features, are difficult to implement. The complexity of the electronic forms often results in repeated failures or breakdowns of form component interactions. This is especially true in scenarios in which an electronic form is continuously updated over their lifetime and/or multiple variations of an electronic form are desired for integration into separate platforms, each of which may demand its own unique configurations or settings. Attempting to incorporate or revise even a minor feature of a complex electronic form can result in the breakdown or failure of multiple components of the electronic form. These failures or breakdowns are often exacerbated when multiple individuals or entities are collaborating to create or revise the electronic forms.

In the event that form component interactions breakdown or fail, it is difficult to identify the issue causing the failure or breakdown and to resolve the issue appropriately. Moreover, in many scenarios, one particular version of an electronic form may be functioning properly, but may cease to function properly due to updates or changes that are incorporated into the electronic form. While a form developer may desire to restore the properly functioning version of the form in these scenarios, such may not be possible if the prior version of the form was not separately stored or archived. Additionally, even if a prior version of an electronic form was stored or archived, restoring the particular version of the electronic form can be difficult and may require the form developer to review the settings of multiple archived forms to identify the desired version. Moreover, assuming a previously working version of an electronic form can be identified, it is very difficult to determine the cause of the failure or breakdown (e.g., whether the failure or breakdown resulted from changes to configurations or settings associated with the electronic form, changes in workflows associated with the electronic form, and/or changes in the system hosting or using the electronic form).

BRIEF DESCRIPTION OF DRAWINGS

To facilitate further description of the embodiments, the following drawings are provided, in which like references are intended to refer to like or corresponding parts, and in which:

FIG. 4 is an exemplary customization interface for a text field component in accordance with certain embodiments;

FIG. 6 is an exemplary customization interface for an e-signature component in accordance with certain embodiments;

FIG. 7 is an exemplary customization interface for a date selector component in accordance with certain embodiments;

FIG. 8 is an exemplary customization interface for a decision component in accordance with certain embodiments;

FIG. 9A is an exemplary customization interface for a workflow component in accordance with certain embodiments;

FIG. 13 is an exemplary interface that includes a version history timeline in accordance with certain embodiments;

FIG. 16B is another exemplary customization interface that is configured in a comparison mode in accordance with certain embodiments;

FIG. 18 is an exemplary interface that may be displayed in connection with performing a restore operation in accordance with certain embodiments;

DETAILED DESCRIPTION OF EXEMPLARY EMBODIMENTS

Figure 1:
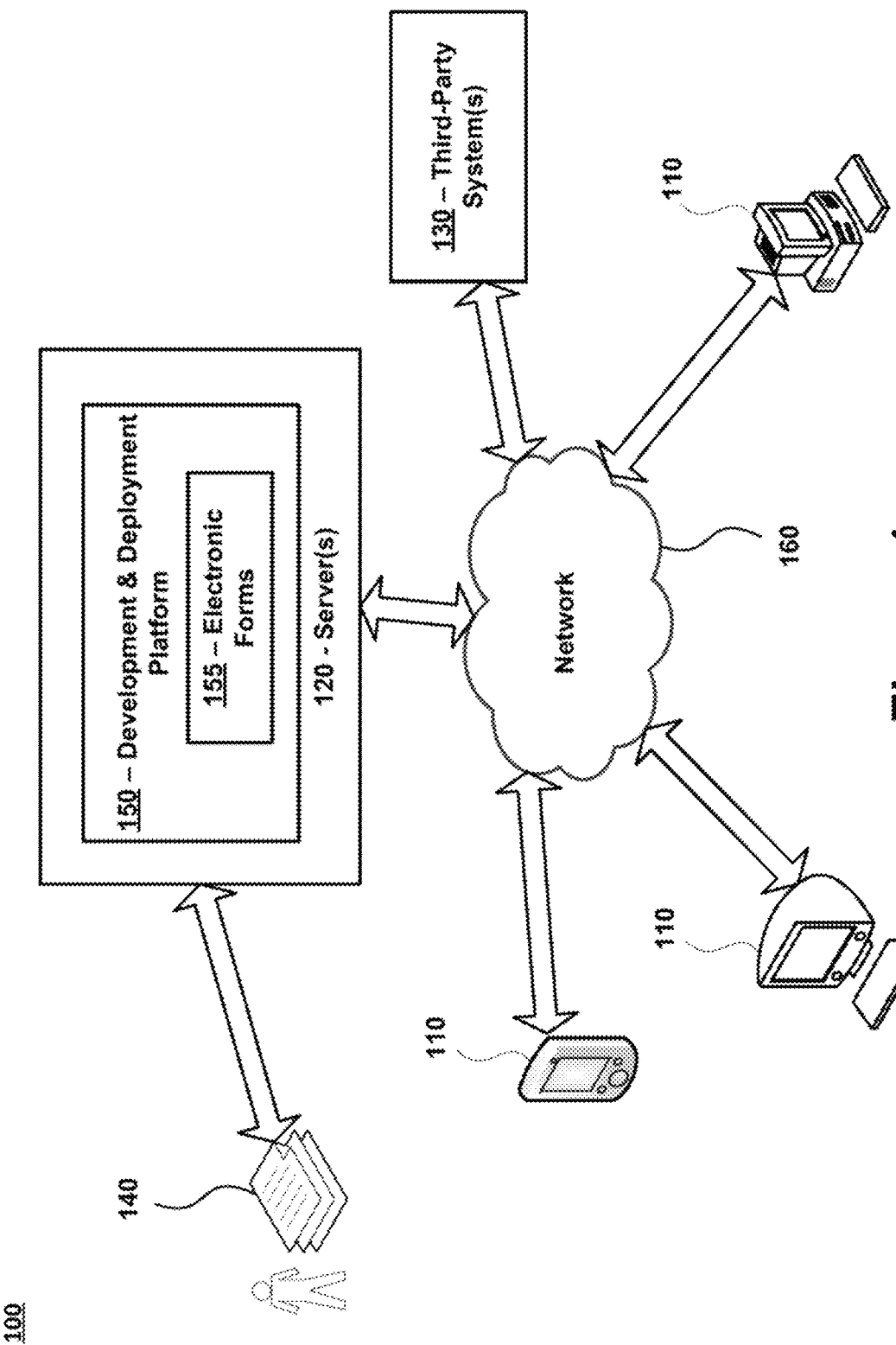
FIG. 1 is a diagram of an exemplary system for developing and deploying electronic forms in accordance with certain embodiments.

The present disclosure relates to systems, methods, apparatuses, and computer program products that enable the dynamic generation and deployment of software and advanced applications including electronic forms for use in a variety of computing environments. A development and deployment platform provides specialized graphical user interfaces (GUIs) that enable the generation of the advanced electronic forms and/or other applications. The development and deployment platform may include a version control component that performs various functions for managing multiple versions of electronic forms and form components (e.g., workflows, templates, transforms, data models, and/or other components made available via the development and deployment platform). As explained in further detail below, the version control component can be configured to perform functions associated with archiving, comparing, accessing, restoring, organizing, and/or managing multiple versions of these and other features. For example, the version control component can be configured to track changes across multiple versions of the electronic forms and/or form components, and visually display the changes and histories associated with the electronic forms and/or form components.

In certain embodiments, the development and deployment platform provides a GUI-based environment that can include a form generation interface that enables users to drag-and-drop components into a development window to define the content, functionality, workflow, background processes, and other criteria for the electronic forms. The components may correspond to pre-defined or pre-packaged software bundles that can be integrated into the electronic forms being created to define input fields, design layouts, application functions, preconfigured templates, and advanced control features (e.g., which allow for advanced event and workflow control) for the electronic forms. Each of the components may be associated with a customization interface that enables the parameters, content, functionality, and/or other features of the components to be customized. After electronic forms are completed, options can be selected to deploy the forms in a cloud-based environment and/or in other ways. In this manner, the GUI-based development environment enables advanced electronic forms to be created by users in real-time without any technical or programming knowledge. The platform can then instantly deploy the advanced electronic forms and related software for newly-created products and services.

In certain embodiments, the electronic form solutions described herein may be viewed as an improvement on traditional paradigms utilized to create application programs. Traditionally, application programs can be divided into three separate layers: an interface layer that allows for interaction with end users; a logic layer that controls the execution of the program; and a storage layer that stores data associated with the program. The development environment disclosed herein can create an electronic form application that bundles all three of these layers into an application package that can be easily integrated and deployed by any existing system. In certain embodiments, this may be accomplished, at least in part, by integrating the logic layer directly into the components that are utilized to construct the interface layer, and building a database into the software bundle that includes the electronic form application.

Another improvement provided by the platform relates to the advanced control components that are made available via the GUI-based development environment. These components permit users to precisely define various event processing and workflow management operations that could previously only be implemented with significant efforts by developers having in-depth programming knowledge.

One particularly useful control component is a decision component. Generally speaking, the decision component permits actions to be executed by background processes of the electronic forms in response to detecting specified inputs or events. The actions can be executed in real-time as the electronic forms are being filled out without having to reload a webpage or application that is presenting the electronic forms. The decision component includes a customization interface that enables users to identify a first set of components to be monitored in real-time as the forms are being filled out, to identify actions that should be executed in connection with a second set of components in response to inputs received via the first set of components, and to specify logic and/or conditions that determine if and when such actions should be executed. The decision component enables various actions to be executed in real-time including, but not limited to, validating the contents of the form, changing field values, turning on/off the visibility of the components (e.g., dynamically adding or removing fields in the electronic form), outputting messages on the form interface, transmitting back-end error messages (e.g., for processing by error handlers), navigating to particular pages or sections of the form, and/or performing other functions. All of this functionality is able to be specified by users who may have little or no technical knowledge or programming skills.

Another useful control component is the workflow component. Generally speaking, the workflow component enables a non-technical user to design custom background processes that enable advanced processing of inputs received via an electronic form and outputs presented on the electronic form. The workflow component is versatile and can be tailored to accommodate a wide variety of functions. A customization interface associated with the workflow component enables a node diagram to be defined for incorporating dynamic processing operations into the electronic form. Input nodes, processing nodes, and output nodes can be inserted into the diagram and mapped to one another to define the dynamic operations. The input nodes can correspond to fields or components of the electronic form that are monitored in real-time to detect when inputs are received. Each of the input nodes can be mapped to one or more processing nodes which can perform various operations on the data received via the input nodes. For example, the processing nodes can be configured to perform filtering, selecting, sorting, deleting, mapping, merging, appending, parsing, natural language processing (NLP), and/or other types of operations on the data received via the input nodes. The processing nodes can then be mapped to one or more output nodes, which may correspond to fields or components in the electronic form that are updated in real-time to output the data generated by the processing nodes. Once again, all of this functionality is able to be specified by users who may have little or no technical knowledge or programming skills.

After an electronic form has been created, the development and deployment platform provides an integration tool that enables the electronic form to be deployed (e.g., by making the form available to end-users in a public and/or private setting). In certain embodiments, the electronic forms created via the platform are deployed directly on the platform itself (e.g., by creating an instance of the form which resides in a cloud-based environment associated with the platform) and/or deployed by third-party systems (e.g., platforms, websites, or systems which are hosted by individuals or entities external to the platform). In certain embodiments, the creation of an electronic form automatically generates a corresponding application programming interface (API) associated with the electronic form. Thus, once the form is deployed, the API can enable the electronic form to be directly queried and/or executed without accessing a GUI corresponding to the form. Any data collected by the electronic form (via the GUI and/or API associated with the form) can be stored in one or more databases.

A machine learning component of the platform can be configured to process the data collected by the electronic forms. The manner in which the machine learning component processes the information can vary based on the nature of the form and/or the purpose of the form. In certain embodiments, the machine learning component may analyze aggregated data previously collected via one or more of the electronic forms to identify rules, fields, and/or logic associated with the forms that should be modified (e.g., to remove or modify fields and parameters that are required for validation). The rules and/or logic identified by the machine learning component can be based on various business objectives as discussed in further detail below.

In certain embodiments, the machine learning component executes functions for enriching the data collected by the platform and making predictions based on previously collected data. For example, the machine learning component can enrich data collected by the platform by automatically converting and mapping hard copy forms to electronic forms, detecting potential validation and/or NIGO ("not in good order") issues, and calculating confidence scores related to the conversion. The machine learning component can also be configured to analyze aggregated data to predict various trends and factors (e.g., which may be related to the products and/or services associated with the electronic forms).

In certain embodiments, the version control component can be configured to manage and control versioning of multiple features that are generated by, or made accessible through, the development and deployment platform. Amongst other things, the version control component can be configured to perform functions associated with archiving, comparing, restoring, accessing, organizing, and/or managing multiple versions of electronic forms and associated form components (e.g., electronic templates, workflows, transforms, data models, and/or other features of the development and deployment platform).

The version control component can archive and/or store multiple versions of each electronic form that is generated and/or updated using the development and deployment platform. In certain embodiments, the version control component can generate a version history timeline that lists or identifies each version of an electronic form in chronological order, along with various metadata associated with each version (e.g., such as the creator of the version, timestamps indicating when the version was created, and/or other information). The version history timeline can be accessed directly in the GUI-based environment that is utilized to generate and/or update the electronic form. Each entry included in the version history timeline can correspond to a separately stored or archived version of the electronic form, and a form developer may select the entries in the version history timeline to access the stored versions and to perform various actions (e.g., to view, restore, organize, and/or compare versions).

The version control component can execute a comparison function that is configured to identify changes (e.g., additions, deletions, and/or edits) between or among multiple versions of electronic forms. The version control component can display an electronic form in a comparison mode that is annotated to include visual indicators that identify changes between or among different versions of forms. For example, in the comparison mode, an annotated version of the electronic form may be displayed on an interface which includes visual indicators that highlight and/or depict changes of one version of an electronic form relative to another version of the electronic form. The manner in which the changes are highlighted and/or depicted using visual indicators can vary as discussed in further detail below.

The version control component can be configured to perform similar functions for various form components including, but not limited to, electronic templates, workflows, transforms, data models, and/or other components available via the development and deployment platform. For example, for each of these and other components, the version control component can archive or store various versions, generate a version history timeline that identifies and provides access to the stored versions, and/or execute comparison functions which identify changes between or among stored versions of these components.

The version control component provides many advantages to form builders. Amongst other things, it allows form builders to quickly and easily fix or debug malfunctions or failures for a non-working version. For example, such malfunctions and failures can be easily identified and detected using a comparison function that compares a known working version to another malfunctioning version and displays visual indicators on an interface that identify the differences or changes between the versions to the form builder. Additionally, the version control component can track updates incorporated into each version by storing information that identifies who made the updates and when the updates were made, thus enabling the source of any malfunctions or failures to be easily identified in scenarios where multiple individuals are collaborating to generate or update a version.

Additionally, the archival or storage functions of the version control component can allow for easy identification and organization of stored versions, which can be very useful in scenarios where there are large numbers (e.g., dozens, hundreds, or even thousands) of stored versions. Amongst other things, the version control component can permit easy identification of relevant versions using various designations (e.g., starred, promoted, and/or label indicators) and can provide various filters for searching the stored versions. In the event that a version fails or malfunctions, these designations and filters can enable a user to easily identify and restore a previous version that functions properly. The restored version can be deployed to minimize downtime and/or can be used as a starting point for creating an updated version that functions properly.

Even further, because the version control component can be integrated directly into the GUI-based environment that is utilized to create and update electronic forms and associated form components (e.g., templates, workflows, transforms, data models, etc.), the functionality of the version control component can be easily accessed and utilized by form builders. The integration of the version control component directly into the development environment prevents form builders from having to access, or search through, separate archival programs or databases that may store previous versions of an electronic form or form components. For example, the integration of the version control component into the development environment can enable users to easily select stored versions included in a version history timeline for viewing, editing, comparison, and/or restoration directly within a development window. It further permits users to provide or share comments pertaining to the versions and to assign appropriate designations to the versions, both of which can be useful in scenarios involving collaboration among multiple users.

The technologies discussed herein can be used in a variety of contexts and environments. Generally speaking, these technologies may be useful for any system or industry that intakes large quantities of data through various sources, and/or that desires electronic forms that can be easily customized and deployed. For example, integrating the present technologies into an insurance platform can enable the platform to quickly and easily define and deploy customized insurance products to end-users. Another useful application of these technologies is in the context of the healthcare industry. For example, integrating the present technologies into an electronic healthcare platform can enable the platform to quickly and easily define and deploy forms associated with patient onboarding, electronic medical records, medical insurance products, and/or the like. Another useful application of these technologies is in the context of the financial industry. For example, integrating the present technologies into a financial platform can enable the platform to quickly and easily define and deploy forms associated with obtaining loans, mortgages, brokerage accounts, financial products, and/or the like. Other industries and/or sectors in which these technologies can be applied include the real estate industry, travel industry, marketing and advertising industry, education industry, accounting industry, and the public sector. The technologies discussed herein can also be applied to other industries and/or systems other than those explicitly mentioned herein.

As evidenced by the disclosure herein, the inventive techniques set forth in the disclosure are rooted in computer technologies that overcome existing problems in known software development and deployment solutions, specifically problems dealing with creating, updating, deploying, archiving, and comparing advanced electronic forms. The techniques described in this disclosure provide a technical solution (e.g., one that includes a specialized GUI-based development environment that allows advanced functionality to be incorporated into the electronic forms and which provides customization of the forms at granular levels) for overcoming such limitations. For example, the GUI-based development environment provided by the development and deployment platform described herein can facilitate electronic, real-time, and dynamic form creation by providing users with customizable, pre-packaged software components that can be dragged-and-dropped into a development window for creating the electronic forms. This GUI-based development environment can further be configured to implement version control management on various components and to enable visual comparisons to be displayed which identify changes of versions relative to one another. This technology-based solution marks an improvement over existing computing capabilities and functionalities related to electronic form development and versioning by, inter alia, enabling advanced functionality to be incorporated into the electronic forms by users who have no technical knowledge or programming skills, enabling instant deployment of such forms within an integrated software platform, and enabling automated version control and comparison across multiple versions of electronic forms and other components.

The GUI-based software development environment described herein enables users to easily define and customize rulesets for the electronic forms being created and/or modified. As various components (e.g., decision components, workflow components, input field components, layout components, data models, etc.) are dragged-and-dropped, or otherwise inserted, into a development window to define an electronic form, the development environment automatically inserts programming code, logic, and/or instructions into the electronic form for defining a ruleset that controls the execution and presentation of the electronic form. The functions configured to automatically create these rulesets, which allow for advanced processing operations to be implemented in the electronic forms, improves the technological field related to software development.

In certain embodiments, a system is provided which comprises one or more computing devices comprising one or more processors and one or more non-transitory storage devices for storing instructions, wherein execution of the instructions by the one or more processors causes the one or more computing devices to: provide access to a software development platform that includes one or more graphical user interface (GUIs) configured to create or modify an electronic form; present, via the one or more GUIs, a development window that is configured to define the electronic form; detect form components that are dragged-and-dropped into the development window to incorporate content, functionality, background processes, and event handling operations for the electronic form being created or modified; receive, from customization interfaces associated with the form components, selections to customize parameters for each of the form components added to the electronic form being created or modified; and generate or update the electronic form based on the form components that are dragged-and-dropped into the development window and based on the selections received from the customization interfaces.

In certain embodiments, a method is provided which comprises: providing access to a software development platform that includes one or more graphical user interface (GUIs) configured to create or modify an electronic form; presenting, via the one or more GUIs, a development window that is configured to define the electronic form; detecting form components that are dragged-and-dropped into the development window to incorporate content, functionality, background processes, and event handling operations for the electronic form being created or modified; receiving, from customization interfaces associated with the form components, selections to customize parameters for each of the form components added to the electronic form being created or modified; and generating or updating the electronic form based on the form components that are dragged-and-dropped into the development window and based on the selections received from the customization interfaces.

In certain embodiments, a system is provided which comprises: one or more computing devices comprising one or more processors and one or more non-transitory storage devices for storing instructions, wherein execution of the instructions by the one or more processors causes the one or more computing devices to: provide access to a software development platform that utilizes one or more GUIs to generate an electronic form; receive first selections via the one or more GUIs to generate a version of the electronic form; store the version of the electronic form; receive second selections via the one or more GUIs to generate at least one updated version of the electronic form; store the at least one updated version of the electronic form; execute a comparison function that is configured to identify one or more changes between the version of the electronic form and the at least one updated version of the electronic form; and generate a GUI that displays one or more visual indicators corresponding to the one or more changes.

In certain embodiments, a method is provides that includes: providing, with one or more processors, access to a software development platform that utilizes one or more graphical user interfaces (GUIs) to generate an electronic form; receiving first selections via the one or more GUIs to generate a version of the electronic form; storing the version of the electronic form on one or more non-transitory storage devices; receiving second selections via the one or more GUIs to generate at least one updated version of the electronic form; storing the at least one updated version of the electronic form on the one or more non-transitory storage devices; executing, with the one or more processors, a comparison function that is configured to identify one or more changes between the version of the electronic form and the at least one updated version of the electronic form; and generating, with the one or more processors, a GUI that displays one or more visual indicators corresponding to the one or more changes.

In certain embodiments, a system is provided which comprises: one or more computing devices comprising one or more processors and one or more non-transitory storage devices for storing instructions, wherein execution of the instructions by the one or more processors causes the one or more computing devices to: provide access to a software development platform that utilizes one or more graphical user interfaces (GUIs) to generate an electronic form or form component; receive first selections via the one or more GUIs to generate a version of the electronic form or the form component; store the version of the electronic form or the form component; receive second selections via the one or more GUIs to generate at least one updated version of the electronic form or the form component; store the at least one updated version of the electronic form or the form component; execute a comparison function that is configured to identify one or more changes between the version of the electronic form or the form component, and the at least one updated version of the electronic form or the form component; and generate a GUI that displays one or more visual indicators corresponding to the one or more changes.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature, or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk, and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

FIG. 1 is an exemplary system 100 according to certain embodiments. In this exemplary system 100, a development and deployment platform 150 is stored on one or more servers 120. The development and deployment platform 150 can configured to perform any and all functions described herein with respect to generating and/or creating electronic forms 155, hosting and/or providing access to the electronic forms 155, managing and/or controlling versions of the electronic forms, and/or deploying and/or collecting data and information via the electronic forms 155. For example, in certain embodiments, the development and deployment platform 150 enables users (e.g., non-technical users with no programming knowledge) to generate and/or create advanced electronic forms 155. As explained in further detail below, the development and deployment platform 150 can provide a software development toolkit that enables the electronic forms 155 to be quickly and easily created and customized in a GUI-based environment. After the electronic forms 155 are created, the development and deployment platform 150 can also perform functions associated with the hosting the electronic forms 155 (e.g., to enable end-users to access the forms), collecting and storing data submitted via the electronic forms 155, and/or providing one or more third-party systems 130 with access to the collected data. The development and deployment platform 150 can be further configured to perform functions associated with archiving, comparing, restoring, and/or managing multiple versions of electronic forms, electronic templates, workflows, transforms, data models, and/or other features associated with the development and deployment platform The electronic forms 155 can include web-based forms (e.g., which are accessible via a network 160 that includes the Internet) and/or local application forms 155 (e.g., which are presented by local applications running a computing device 110 and/or server 120). In certain embodiments, the electronic forms 155 can be implemented using Hypertext Markup Language (HTML) and/or one or more web-based programming languages (e.g., such as JavaScript, PHP, CSS, Perl, SQL, Ruby, and/or other web-based languages). The electronic forms 155 can alternatively, or additionally, be implemented in other programming languages such as Java, C++, C, Python, and/or other languages. The electronic forms 155 can represent an application with an interface layer for collecting data, and logic layer for implementing rules associated with the electronic forms 155. The electronic forms 155 can also include, and/or communicate with one or more databases, which provide a storage layer for the electronic forms 155.

One or more computing devices 110 may be configured to access the development and deployment platform 150 over a network 160. The network 160 may represent any type of communication network, e.g., such as one that comprises a local area network (e.g., a Wi-Fi network), a personal area network (e.g., a Bluetooth network), a wide area network, an intranet, the Internet, a cellular network, and/or other types of networks. Additionally, or alternatively, the development and deployment platform 150 may be accessed directly from the device or devices hosting the platform (e.g., via one or more input devices attached to the servers 120 hosting the development and deployment platform 150).

In certain embodiments, the computing devices 110 may represent desktop computers, laptop computers, mobile devices (e.g., smart phones, personal digital assistants, tablet devices, and/or any other device that is mobile in nature), and/or other types of computing devices. In certain embodiments, the development and deployment platform 150 is stored on one or more servers 120. The one or more servers 120 may generally represent any type of computing device, including any of the computing devices 110 mentioned above. In certain embodiments, the one or more servers 120 comprise one or more mainframe computing devices that execute web servers for communicating with the computing devices 110, third-party systems 130, and other devices over the network 160 (e.g., such as the Internet). The one or more servers 120 may be configured to provide interfaces on the computing devices 110 for performing any and all of the functions offered by the development and deployment platform 150.

The users accessing the development and deployment platform 150 (e.g., either directly from the device hosting the platform and/or indirectly by a computing device 110 over the network 160) may include individuals who are seeking to build, create, and/or deploy the electronic forms 155. For example, the development and deployment platform 150 may enable administrators associated with hosting the platform 150 and/or other individuals (e.g., individuals associated with one or more third-party systems 130) to create and/or deploy the electronic forms 155. The users accessing the development and deployment platform 150 can also include individuals that are seeking to submit data via electronic forms 155 after the electronic forms 155 are created. For example, the users may utilize the computing devices 110 to access electronic forms hosted by the development and deployment platform 150 and to submit information via the electronic forms 155.

In certain embodiments, the development and deployment platform 150 may be hosted by an entity that provides assistance to one or more third-party systems 130 with collecting data and information. For example, the third-party systems 130 may be associated with entities that provide products and/or services in various industries (e.g., such as in the insurance, healthcare, financial, real estate, travel, marketing, advertising, education, accounting, and/or other industry). The third-party systems 130 may include websites, computing equipment (e.g., such as computing devices 110 and servers 120), and back-end systems that are used to provide customers with various products and/or services, some or all of which may rely on or utilize data that is provided by the customers via electronic forms 155 and/or hardcopy forms 140 (e.g., paper forms). The development and deployment platform 150 can be used to create, design, and deploy electronic forms 150 for the third-party systems 130. The electronic forms 150 created for the third-party systems 130 can be hosted on the development and deployment platform 150 and/or can be hosted by the third-party systems 130. The development and deployment platform 150 can be configured to collect and store any data and information received by the electronic forms 155. The development and deployment platform 150 can also be configured to provide the third-party systems 130 and/or individuals associated with the third-party systems 130 with access to the data and information collected via the electronic forms 155.

In certain embodiments, the development and deployment platform 150 can also be configured to receive and process hardcopy forms 140 (e.g., which may include paper forms or the like). For example, upon receiving the hardcopy forms 140, the development and deployment platform 150 may convert the hardcopy forms 140 to electronic forms 155. This conversion process may include scanning into the hardcopy forms 140 (e.g., using optical scanning equipment), analyzing the scanned data to automatically extract the information being provided by the hardcopy forms 140, and automatically populating fields of corresponding electronic forms 155 (or corresponding APIs associated with the forms) with the information from the hardcopy forms 140. The data associated with the converted forms can then be made available to the third-party systems 130 via the development and deployment platform 150.

Thus, in certain embodiments, the development and deployment platform 150 can provide an end-to-end system for collecting and processing information submitted in any medium (e.g., including both hardcopy forms 140 and electronic forms 155) for the third-party systems 130. The development and deployment platform 150 can also perform functions for validating the information received by the forms to ensure that the information is complete and to eliminate any NIGO ("not in good order") issues. This allows the third-party systems 130 to focus to their core functions and roles associated with providing products and/ or services, and to avoid spending time and resources collecting and validating form information. In certain embodiments, the development and deployment platform 150 can be integrated with the third-party systems 130 (e.g., such that the entity or system hosting the development and deployment platform 150 is the same entity or system that is affiliated with the third-party systems 130).

The system 100 in FIG. 1 may include any number of computing devices 110, any number of servers 120, and any number of third-party systems 130. All the system components, including the computing devices 110, servers 120, third-party systems 130, and development and deployment platform 150 can be configured to communicate directly with each other and/or over the network 160 via wired or wireless communication links, or a combination of the two. Each of the computing devices 110, servers 120, third-party systems 130, and development and deployment platform 150 can also be equipped with one or more transceiver devices, one or more computer storage devices (e.g., RAM, ROM, PROM, SRAM, etc.), and one or more processing devices (e.g., a central processing unit) that are capable of executing computer program instructions. The computer storage devices are preferably physical, non-transitory mediums.

Figure 2:
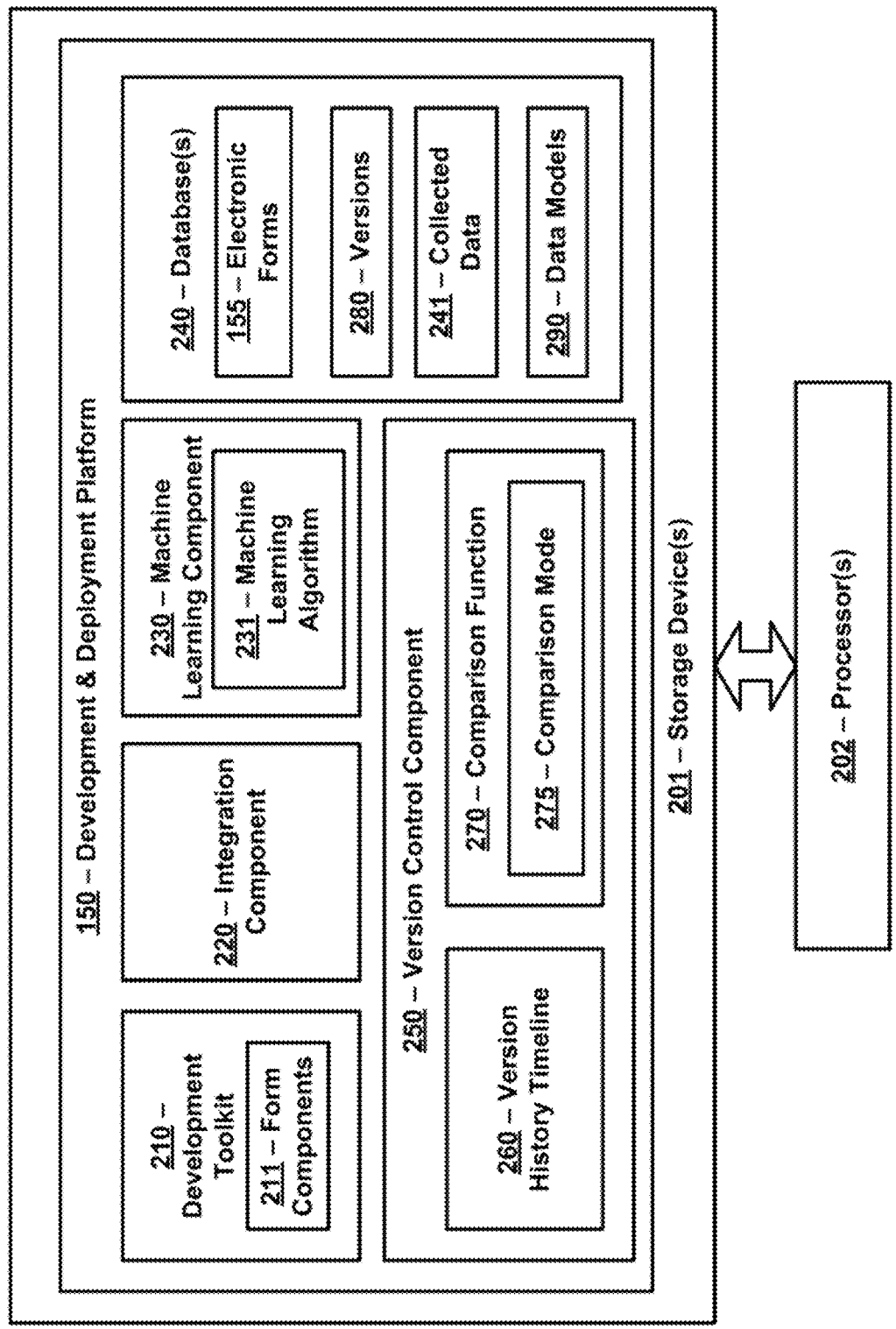
FIG. 2 is a block diagram depicting a detailed view of an exemplary development and deployment platform in accordance with certain embodiments.

FIG. 2 is a block diagram providing a detailed view of an exemplary development and deployment platform 150 in accordance with certain embodiments of the present invention. The development and deployment platform 150 can be stored on one or more storage devices 201 that are in communication with one or more processors 202. The one or more storage devices 201 can include: (i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In these or other embodiments, storage devices 201 can comprise: (i) non-transitory memory and/or (ii) transitory memory. The one or more processors 202 can include one or more central processing units (CPUs), controllers, microprocessors, digital signal processors, and/or computational circuits. The one or more storage devices 201 store data, code, and instructions associated with implementing a development toolkit 210, an integration component 220, a machine learning component 230, a database 240, and a version control component 250. The one or more processors 202 are configured to execute instructions associated with these components. Each of these components is described in further detail below.

The development toolkit 210 can be configured to perform any/or all functions described herein with respect to generating, creating, and/or updating electronic forms 155. In certain embodiments, the development toolkit 210 is configured to display one or more GUIs that enable non-technical users to create advanced forms. As discussed in further detail with respect to FIG. 3, the GUIs provided by the development toolkit 210 can include a form generation interface that enables users to drag-and-drop form components 211 into a development window. The form components 211 may correspond to pre-defined and/or pre-packaged software bundles that are used to define and customize the content, functionality, design layout, workflow, event handling, data models, and other criteria for the electronic forms 155.

For example, the form components 211 may correspond to pre-packaged software bundles that can be integrated into the electronic forms being created to define and customize input fields (e.g., which may include text boxes, radio buttons, check boxes, text areas, submit buttons, dropdown menus, file upload fields, etc.), design layouts (e.g., which may include pre-configured tables, columns, window panels, and/or other layout features for organizing and presenting information on the forms), application functions (e.g., pre-configured applications modules that can include date selectors, e-signature fields, calculators, text editors, or the like), templates (e.g., which can include previously created forms or portions of forms that can be reused or recycled), data models, and advanced control features (e.g., which allow for advanced control of background processes for event handling and workflow control). The advanced control components that are made available via the GUI-based development environment permit users to precisely define various event processing and workflow management operations associated with the electronic forms. Examples of advanced control components, such as a decision component and a workflow component, are discussed in further detail below.

Each of the form components 211 may be associated with a customization interface that enables the users creating the electronic forms 155 to customize various aspects of the form components 211 that are added to the electronic form 155. For example, the customization interfaces may permit the users to customize the parameters, content, functionality, and/or other features of the components to be customized. Examples of exemplary customization interfaces are discussed below with respect to FIGS. 4-8 and 9A-9B. After the user creating the form has finished adding and customizing the form components 211 for the electronic forms 155, the user can select an option to save the electronic forms 155 in the database 240. The user can access any saved forms via the development toolkit 210 at a later time in order to update and/or modify the saved forms.

In certain embodiments, the development and deployment platform 150 can enable form builders or other users to create, store, and/or update data models 290 for use in creating and/or updating electronic forms 155. The data models 290 can be utilized to define data structures that are used to represent various types of objects. For example, data models 290 can be used to define data structures for objects corresponding to persons, vehicles, contracts, products or services (e.g., products or services associated with insurance, real estate, financial, and/or medical industries), etc. The data models 290 can store information that defines or identifies the form components 211 (e.g., input fields and/or templates) utilized to collect information pertaining to the objects. The data models 290 can also store information for mapping the form components 211 associated with the objects to databases and/or database schemas for storage. The data models 290 can also store various rules that are to be associated with the objects. For examples, the data models 290 can be utilized to enforce rules for collecting data pertaining to the objects (e.g., to enforce business rules, regulatory compliances, and/or government policies on the data) and/or to associate data models 290 with other objects.

In certain embodiments, after the user has added (or while the user is adding) the form components 211, the development and deployment platform 150 may analyze the data models 290 associated with the form components 211 and display warnings and/or notifications associated with the form components 211 to the user. In some cases, the warnings and/or notifications may indicate that data expected to be captured via an input field component and/or other form component 211 may include personal identifiable information (e.g., social security number, driver's license number, bank account number, credit card number, etc.) and/or other sensitive information (e.g., salary information, birth date, etc.) that should not be stored in a database 240. For example, warnings and/or notifications may be displayed by analyzing information (e.g., textual descriptions, field names, and/or variable names) in the data models 290 associated with the added form components 211. The warnings and/or notifications can be displayed in various formats (e.g., icons, pop-up windows, highlighting, etc.). Other similar types of warnings and/or notifications can be presented to users who have added, or who are adding, form components 211 to an electronic form 155.

Like the other features that are created and/or updated on the development and deployment platform 150, GUIs can be accessed to easily create and update the data models 290. For example, the GUIs may be accessed that enable a user to specify input fields to be associated with an object, map the input fields of the object to one or more databases or database schemas, specify rules associated with the data model 290, and/or associate the data model 290 with one or more additional objects (e.g., to associate the data model 290 as a subclass or superclass of one or more additional objects).

To illustrate by way of example, one or more interfaces accessible via the development and deployment platform 150 can enable a user to create a data model for a "person" object. The one or more interfaces may enable the user to select input fields to be associated with the person object (e.g., input fields corresponding to an individual's name, age, date of birth, address, etc.), map the input fields to particular database schemas for storage, define rules for the object (e.g., rules indicating that the date of birth should be specified in digits, or rules indicating whether certain input fields are optional and/or required), and/or associate the person object with one or more additional objects (e.g., to associate the person object with an "employee" object or "customer" object, each of which may be associated with a separate data model 290 for defining additional aspects of those objects). The one or more interfaces for creating and/or updating the data models 290 can include and display various options that enable users to perform these and other functions.

In certain embodiments, the data model 290 for an electronic form 155 can be created or generated automatically by the development and deployment platform 150 based on the specified settings and/or configurations of the electronic form 155. For example, after a user has created and customized an electronic form 155 (e.g., using one or more form generation interfaces 301), the development and deployment platform 150 can automatically generate the data model 290, which may including automatically mapping input field components 312 and/or form components 211 to one or more databases or database schemas. After the data model 290 is automatically generated, the user can then access one or more interfaces associated with the data model 290 to enable editing and/or customization of the data model 290.

The development and deployment platform 150 can additionally, or alternatively, permit a user to initially create and customize a data model 290 that can be utilized to automatically generate a corresponding electronic form 155. For example, a user who wishes to create an electronic form 155 may initially specify a data model 290 to be used for the electronic form (e.g., by mapping or correlating desired input field components and/or other form components 211 with one or more databases or database schemas). The development and deployment platform 150 may then analyze the data model 290 and utilize the data model 290 to automatically create a corresponding electronic form 155 (e.g., which includes input field components and/or other form components 211 corresponding to the configurations in the data model 290). After the electronic form 155 is automatically generated, the user can then access one or more interfaces associated with the electronic form 155 to enable editing and/or customization of the electronic form 155.

The integration component 220 can be configured to perform any and/or all functions described herein with respect to deploying completed electronic forms 155 and/or making the electronic forms 155 available to users. For example, after a user creates an electronic form 155 utilizing the development toolkit 210, the integration component 220 enables the user to deploy the electronic form 155. Once the electronic form 155 is deployed, various customers (e.g., individuals seeking insurance or financial products and services) or other users can access the electronic form 155 and submit information via the electronic form 155.

Any information collected via an electronic form 155 that has been deployed may be saved and stored as collected data 241 in the database 240. The collected data 241 may include data and information corresponding to one or more products and/or services being offered by entities associated with the third-party systems 130. For example, the collected data 241 saved in the database may include personal information (e.g., name, age, address, etc. associated with a customer), product information (e.g., selections made by the customer which correspond to options for products and/or services associated with the electronic form), documents (e.g., which may be uploaded via the form), etc.

The integration component 220 can deploy the electronic forms 155 in various ways. In certain embodiments, the integration component 220 deploys the electronic forms 155 by storing the electronic forms 155 on a server(s) 120 and/or in a cloud environment associated with the development and deployment platform 150. In such embodiments, the electronic forms 155 may be managed and/or hosted by the development and deployment platform 150. Customers or other users seeking to submit information via the electronic forms 155 can then access the development and deployment platform 150 (e.g., using the computing devices 110) to provide information via the electronic forms 155. Additionally, or alternatively, the integration component 220 may deploy the electronic forms 155 by integrating the forms into one or more third-party systems 130. In such embodiments, the electronic forms 155 can be stored on a server(s) and/or in a cloud environment associated the third-party systems 130. Customers or other users seeking to submit information via the electronic forms 155 can then access the third-party systems 130 (e.g., using the computing devices 110) to provide information via the electronic forms 155. All data collected via the electronic forms 155 (e.g., such as the collected data 241), whether hosted on the development and deployment platform 150 and/or the third-party systems 130, can be stored in the database 240.

Once deployed, the integration component 220 and/or other components of the development and deployment platform 150 can execute a form passing procedure that enables the forms to be passed among multiple devices (e.g., computing devices 110) while being filled out or during completion. The form passing procedure can be useful for protecting confidential and/or sensitive information that is being submitted via the forms, and for masking such information from certain individuals who are assisting with the completion of the forms. The software development toolkit 211 described above can include components and/or other options for integrating the form passing procedure into the electronic forms 155.

Consider a scenario where an intermediary (e.g., a broker, agent, and/or other individual) is assisting a customer with filling out an electronic form 155. In some cases, the electronic form 155 may request confidential and/or sensitive information (e.g., which may be related to medical records, legal records, governmental records, etc.) and the customer may not want to disclose this information to the intermediary. In this scenario, while the intermediary is filling out the electronic form 155, the intermediary may select an option for passing the electronic form 155 from a computing device 110 associated with the intermediary to a computing device 110 of the customer (e.g., the customer's mobile device). The form can be passed to the device of the customer via the network 160 in various ways (e.g., via a link included in an e-mail or text sent to the customer, an interface presented on by application stored on the customer's device, a webpage or website that the customer can access, and/or in other ways). This enables the customer to provide the confidential and/or sensitive information without disclosing the information to the intermediary. After the customer has completed the portion of the electronic form 155 requesting the confidential and/or sensitive information, the customer can submit the electronic form 155 and/or pass the form back to the intermediary for completion. If the electronic form 155 is passed by back to the intermediary, the rules associated with the electronic form can prevent the intermediary from viewing and/or accessing the confidential and/or sensitive information.

The above example described an application of the form passing procedure among two individuals. However, it should be understood that the form passing procedure can be utilized to share an electronic form 155 among any number of individuals, and that the form passing procedure can be utilized in other contexts to permit sharing of the electronic forms 155.

The machine learning component 230 can include one or more machine learning algorithms 231 that are configured to analyze the data stored in the database 240 (e.g., the collected data 241) and/or other data for a variety of purposes. In certain embodiments, the machine learning algorithms 231 analyze the collected data 241 to optimize the products and/or services being offered by the third-party systems 130. For example, the machine learning algorithms 231 analyze the collected data 241 (e.g., which may be aggregated over time) to identify rules, parameters, and/or other features of the products that can be modified or removed to optimize the products and/or services being offered. The machine learning component 230 may display recommendations to change or modify such data on an interface along with statistics associated with the analysis of the stored data.

As illustrated by way of example, consider a scenario in which the development and deployment platform 150 is utilized to provide assistance to a third-party system 130 that provides insurance products and/or services. Forms may be provided for onboarding new customers in connection with the products and/or services, and also for processing insurance claims submitted in connection with existing customers. In this scenario, the machine learning component 230 (e.g., using the machine learning algorithms 231) may be configured to analyze contents of the database 240 to identify rules that have a negative impact on the underwriting process for the insurance products and/or services. The rules may be integrated into the electronic forms 155 corresponding to the products and/or services as input fields, parameters, and/or logic that is required for validation of the onboarding form. By analyzing data associated with the products and/or services (e.g., including the collected data 241 associated with previously submitted insurance claims), the machine learning component 230 may identify rules that should be modified or removed to optimize the products and/or services. This may include identifying rules that have a minimal impact on the risks associated with the insurance products and/or services (e.g., risks associated with the underwriting process), but which may be required to validate completion of the electronic forms 155 associated with the products and/or services. The machine learning component 230 may then generate an interface that displays recommendations and statistical data related to the analysis. The interface may also provide options for automatically modifying the portions of the form that correspond to the identified rules and/or accessing the electronic form via the development toolkit 210 to enable editing of the electronic form.

The machine learning component 230 can be configured to perform similar analyses for other types of products and/or services offered by the third-party systems. For example, the machine learning component 230 can be configured to optimize products and/or services offered in connection with the healthcare, finance, real estate, travel, marketing, advertising, education, and/or accounting industry.

The machine learning component 230 can also be configured to make predictions associated with existing and future products and services. For example, the machine learning algorithms 231 may analyze the data aggregated by the platform 150 to predict trends associated with such products and services. This may include predicting a likelihood of success and/or failure of a product or service based on analysis of the aggregated data. Such predictions consider the specific types of products and/or services being offered, the particular geographic areas where the products and/or services being offered, demographic information (e.g., age, sex, race, etc.) of an existing or anticipated customer base, and/or other information that may be discerned from the aggregated data.

In certain embodiments, the machine learning component 230 also executes functions for enriching the data collected by the platform. This may include enriching data collected by the platform automatically via hard copy forms 140. For example, the machine learning algorithms 231 can be configured to convert hard copy forms 140 to electronic forms 155 by automatically mapping data from the hard copy forms 140 to electronic forms 155. The automatic mapping of forms may be performed by training the machine learning component 230 using a set of training data that teaches the machine learning algorithms 231 to determine appropriate mapping information.

The machine learning component 230 can also analyze any information collected via the hardcopy forms 140 and/or electronic forms 155 for potential validation and/or NIGO-related issues, and compute related confidence scores. The confidence scores computed by the machine learning component can indicate confidence measures associated with the accuracies of conversions (e.g., conversions from hardcopy forms 140 to electronic forms 155), confidence measures associated eliminating validation and NIGO-related issues, and/or other similar types of metrics.

The database 240 can store any and all data associated with the development and deployment platform 150. This may include any data associated with creating electronic forms 155, any data collected via the electronic forms 155, any data associated with settings for the third-party systems 130, any data associated with storing versions 280 of electronic forms 155, and/or any other data. Also, while the database 240 in FIG. 2 is depicted as a single component, it should be understood that the database 240 may represent a plurality of databases 240. In certain embodiments, separate databases 240 can be maintained for each of the third-party systems 130 serviced by the development and deployment platform 150 and/or for each of the electronic forms 155 created by the platform 150.

As mentioned above, the version control component 250 can be configured to perform functions associated with archiving, comparing, restoring, and/or managing multiple versions 280 of electronic forms, electronic templates, workflows, transforms, data models, and/or other form components associated with the development and deployment platform. For each of these components (and/or other components that are made available via the development and deployment platform 150), the version control component 250 can generate a version history timeline 260 that displays a listing of archived versions 280 corresponding to the component. The version history timeline 260 enables access and viewing of each of the versions, and can identify information pertaining to each version (e.g., indicating who created the version and when it was created).

For example, the version control component 250 may generate for each electronic form 155 a version history timeline 260 that displays a plurality of stored versions 280 of the electronic form 155, for each workflow a version history timeline 260 that that displays a plurality of stored versions 280 of the workflow, for each transform a version history timeline 260 that displays a plurality of stored versions 280 of the transform, for each template a version history timeline 260 that displays a plurality of stored versions 280 of the template, for each data model 290 a version history timeline 260 that displays a plurality of stored versions 280 of the data model 290, etc. In certain embodiments, the version history timelines 260 can be displayed directly in the GUI-based environment that enables creation and/or updating of the electronic forms, workflows, transforms, templates, and other components, and the version history timelines 260 can display entries corresponding to the various stored versions 280 of these components. The entries in the version history timelines 260 can be selected to perform various actions (e.g., to view the stored versions 280, compare two or more stored versions 280, restore option a previous version 280 to be a current version, assign designations to versions 280, etc.).

In certain embodiments, the version control component 250 can include a comparison function 270 that enables comparison of two or more stored versions 280 of a component (e.g., an electronic form, form component, template, transform, workflow, data model, and/or other component). The comparison function 270 can compare the two or more stored versions 280 and identify any changes between or among the versions 280. In certain embodiments, the comparison function 270 can display the component associated with the two or more versions in a comparison mode 275 which visually depicts or illustrates the component with annotations or visual indicators that identify the changes between or among the two or more versions 280.

In one example, an individual designing or updating an electronic form 155 may select two (or more) versions 280 of the electronic form 155 listed in a version history timeline 260 for comparison. The comparison function 270 may identify changes or differences between or among the selected versions 280 of the electronic form 155, and display an annotated version of the electronic form 155 in a comparison mode 275 which identifies the changes or differences (e.g., which visually displays and identifies fields, values, text, and/or configuration settings that have been added, deleted, and/or edited).

In another example, an individual designing or updating a workflow may select two (or more) versions 280 of the workflow listed in a version history timeline 260 for comparison. The comparison function 270 may identify changes or differences between or among the selected versions 280 of the workflow, and display an annotated version of the workflow in a comparison mode 275 which identifies the changes or differences (e.g., which visually displays and identifies nodes, connectors, roles, and/or configuration settings that have been added, deleted, and/or edited).

In a further example, an individual designing or updating a transform may select two (or more) versions 280 of the transform listed in a version history timeline 260 for comparison. The comparison function 270 may identify changes or differences between or among the selected versions of the transform, and display an annotated version of the transform in a comparison mode 275 which identifies the changes or differences (e.g., which visually displays and identifies variables, parameters, transform functions, and/or configuration settings that have been added, deleted, and/or edited).

In an even further example, an individual designing or updating a template may select two (or more) versions 280 of the template listed in a version history timeline 260 for comparison. The comparison function 270 may identify changes or differences between or among the selected versions of the template, and display an annotated version of the template in a comparison mode 275 which identifies the changes or differences (e.g., which visually displays and identifies input field components, application components, layout components, advanced control components, and/or configuration settings that have been added, deleted, and/or edited). In another example, an individual designing or updating a data model 290 may select two (or more) versions 280 of the data model 290 listed in a version history timeline 260 for comparison. The comparison function 270 may identify changes or differences between or among the selected versions of the data model 290, and display an annotated version of the data model 290 in a comparison mode 275 which identifies the changes or differences (e.g., which visually displays and identifies input field components, mappings, data schemas, associations, and/or configuration settings that have been added, deleted, and/or edited).

In another example, an individual designing or updating a system component may select two (or more) versions 280 of the system component listed in a version history timeline 260 for comparison. The comparison function 270 may identify changes or differences between or among the selected versions of the system component, and display an annotated version of the system component in a comparison mode 275 which identifies the changes or differences (e.g., which visually displays and identifies input field components, application components, layout components, advanced control components, and/or configuration settings that have been added, deleted, and/or edited).

The above examples are not intended to be limiting. The version control component 250 can be configured to store multiple versions of other components that are made available through the development and deployment platform 150, and to execute similar functions (e.g., for archiving, comparing, restoring, viewing, promoting, etc.) for these components. Additional details of the version control component 250 are discussed below with reference to FIGS. 12-23.

While the components of the development and deployment platform 150 may be depicted in FIG. 2 as being distinct or separate from one other, it should be recognized that this distinction may be a logical distinction rather than an actual or physical distinction. Any or all of the sub-components can be combined with one another to perform the functions described herein, and any aspect or feature that is described as being performed by one component can be performed by any or all of the other sub-components. Also, while the components of the development and deployment platform 150 may be illustrated as being implemented in software in certain portions of this disclosure, it should be recognized that the sub-components described herein may be implemented in hardware and/or software.

Figure 3:
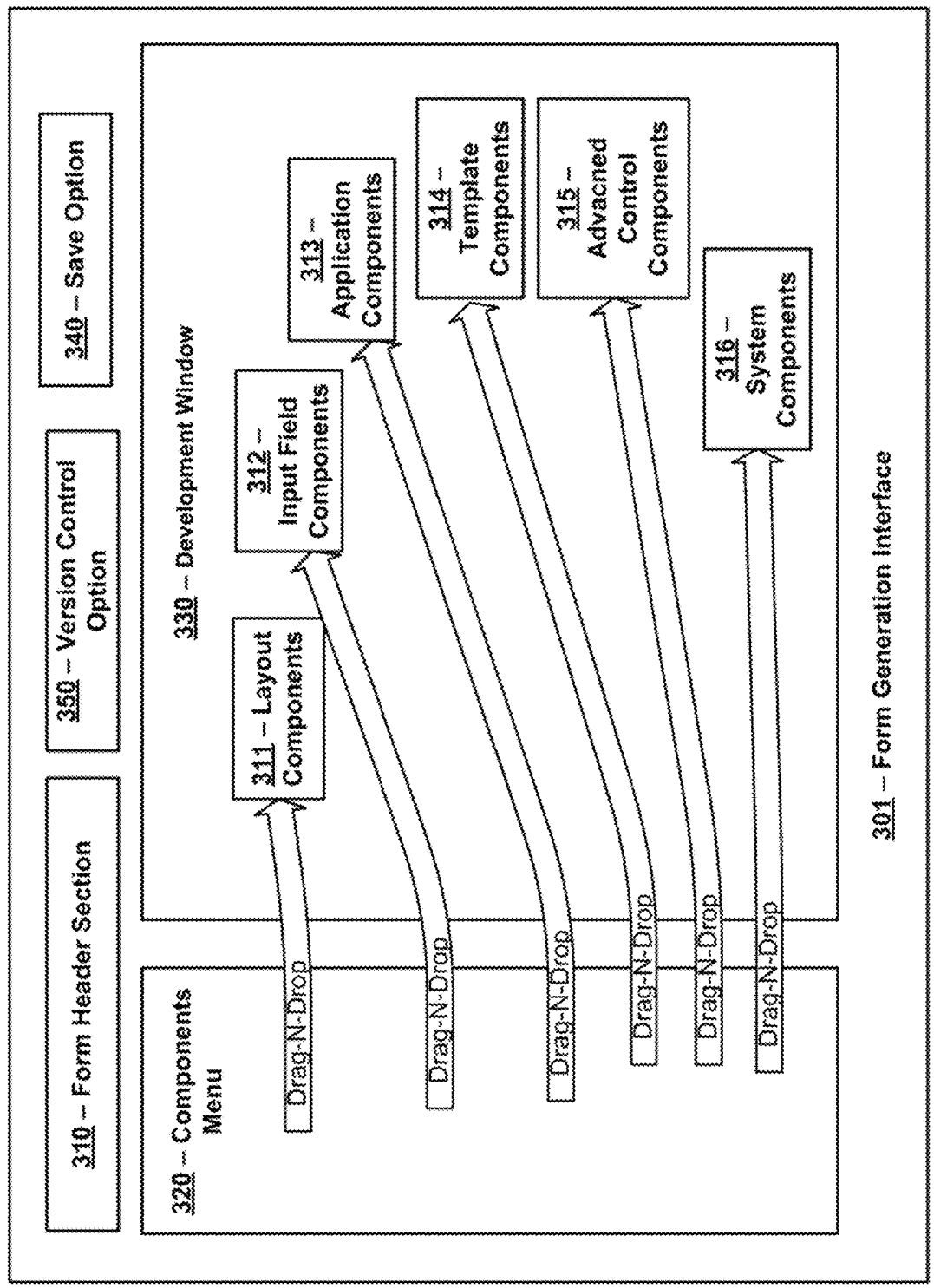
FIG. 3 is an exemplary GUI for creating electronic forms in accordance with certain embodiments.

FIG. 3 is an exemplary form generation interface 300 in accordance with certain embodiments. The form generation interface 300 may be provided by the development toolkit 210 to assist with creating electronic forms 155 and/or modifying existing electronic forms 155. Users (e.g., individuals associated with the platform 150 and/or third-party systems 130) can utilize the form generation interface 300 to create and/or update advanced electronic forms 155 without any technical knowledge or programming experience.

The exemplary form generation interface 300 includes a form header section 310, a component menu 320, a development window 330, a save option 340, and a version control option 350. To create an electronic form 155 using the interface 300, the users can drag-and-drop various form components 211 from the component menu 320 into the development window 330. The developer window 330 is configured to detect when a form component 211 is dragged-and-dropped into the development window 330, to identify the specific type of form component 211 that is being dragged-and-dropped into the development window 330, and to add the component 211 that is being dragged-and-dropped into the development window 330 into the electronic form 155 being constructed. For each form component 211 added to the development window 330, the user can then access a customization interface (e.g., as shown in FIGS. 4-8 and 9A-9B) to customize aspects of the components. The user can also define header information (e.g., the name of the form, the path of the form, etc.) for the form in the form header section 310. Once the form is complete, the user can select the save option 340 to save the electronic form 155 to a database 240.

An exemplary component menu 320 can include a variety of form components 211 including layout components 311, input field components 312, application components 313, template components 314, advanced control components 315, and/or system components 316. Examples of each of these components are discussed in further detail below.

The layout components 311 enable the design or layout of the electronic form 155 to be customized. The layout components 311 can be used to customize the presentation and organization of the fields, content, and other features included in the electronic form 155. Other components included in the component menu 320 (e.g., input field 312, application components 313, and/or template components 314) can be dragged-and-dropped into layout components 311 that have been added to the development window 330 to arrange the presentation of these components. Exemplary layout components may include:

(1) Panel Components: A panel component can be dragged-and-dropped into the development window 330 to add a panel to the electronic form 155, or section of the electronic form 155, being created. The panels may correspond to windows on the electronic form that include an option for expanding and/or collapsing the panels. Other components from the component menu 320 can be inserted into the panel.

(2) Column Components: A column component can be dragged-and-dropped into the development window 330 to add one or more columns to the electronic form 155, or section of the electronic form 155, being created. The column component can be used to align content vertically in the one or more columns. Other components from the component menu 320 can be inserted into the columns.

(3) Table Components: A table component can be dragged-and-dropped into the development window 330 to add a table to the electronic form 155, or section of the electronic form 155, being created. The user can specify any number of rows and columns to be included in the table. Other components (e.g., input field components 312 and/or application components 313) from the component menu 320 can be inserted into the cells of the table.

(4) PDF Component: The PDF component can be dragged-and-dropped into the development window 330 to enable conversion of a PDF form to an electronic form. The PDF component enables the user to map the fields of a PDF to the fields of an electronic form 155. Thus, when a PDF document is uploaded by a customer or other user after the form is deployed, the PDF component can automatically convert the information in the PDF document to an electronic form. The PDF component can additionally, or alternatively, enable content submitted via the electronic form to be converted to a PDF file.

The input field components 312 enable the users to add and customize input fields to the electronic form 155 being created. The input field components 312 may be inserted into the layout components 311 to customize the presentation of the form. Exemplary input field components 312 may include:

(1) Text Field Components: A text field component can be dragged-and-dropped into the development window 330 to add a text field input to the electronic form 155, or section of the electronic form 155, being created.

(2) Text Area Components: A text area component can be dragged-and-dropped into the development window 330 to add a text area input to the electronic form 155, or section of the electronic form 155, being created.

(3) Checkbox Components: A checkbox component can be dragged-and-dropped into the development window 330 to add a checkbox input to the electronic form 155, or section of the electronic form 155, being created.

(4) Dropdown Menu Components: A dropdown menu component can be dragged-and-dropped into the development window 330 to add a dropdown menu input to the electronic form 155, or section of the electronic form 155, being created.

(5) Radio Button Components: A radio button component can be dragged-and-dropped into the development window 330 to add a radio button input to the electronic form 155, or section of the electronic form 155, being created.

(6) File Upload Components: A file upload component can be dragged-and-dropped into the development window 330 to add a file upload input field to the electronic form 155, or section of the electronic form 155, being created. The file upload input field allows files to be uploaded through the form.

(7) Password Components: A password component can be dragged-and-dropped into the development window 330 to add a password input field to the electronic form 155, or section of the electronic form 155, being created.

(8) Submit Button Components: A submit button component can be dragged-and-dropped into the development window 330 to add a submission button to the electronic form 155, or section of the electronic form 155, being created.

(9) Hidden Value Components: A hidden value component can be dragged-and-dropped into the development window 330 to store a hidden value for the electronic form 155, or section of the electronic form 155, being created. The hidden values are not visible on the electronic form. The hidden values can be updated in the background by other components added to the form.

The application components 313 enable users to add and customize preconfigured applications or widgets into the electronic form 155 being created. The preconfigured applications or widgets can be configured to collect inputs, display data, and/or perform other functions associated with the electronic form 155. Exemplary application components 313 may include:

(1) Date Selector Components: A data selector component corresponds to a preconfigured application or widget that provides functions for selecting a date. For example, if a date picker component is added to a form, the form may display a selectable icon of a calendar. Upon selecting the icon, the user may navigate through a calendar and select a date and/or time. This date selector component may be dragged-and-dropped into the developer window 330 to incorporate this application or widget into the electronic form 155 being created.

(2) E-Signature Components: An e-signature component corresponds to a preconfigured application or widget that enables users to electronically sign the forms. For example, the signature component may display a box on the form that permits the user to draw a signature using a mouse. This e-signature component may be dragged-and-dropped into the developer window 330 to incorporate this application or widget into the electronic form 155 being created.

(3) Text Editor Components: A text editor component corresponds to a preconfigured application or widget that enables users to edit text in various ways (e.g., to adjust the size, fonts, alignment, and other text features). After the form has been deployed, a customer or other user may access the form and use the text editor to edit text being submitted through the form. This may be useful when the electronic form 155 is being deployed in connection with a third-party service that publishes content and/or which otherwise requires customized text. This text editor component may be dragged-and-dropped into the developer window 330 to incorporate this application or widget into the electronic form 155 being created.

(4) Charts and Graphs Components: A charts and graphs component corresponds to a preconfigured application or widget that enables users to create a variety of charts and/or graphs. For example, charts and graphs can be created to display information to customers or other users who are filling out a deployed form. The charts and graphs can also be updated in real-time based on inputs received when the form is being filled out by the users. This charts and graphs component may be dragged-and-dropped into the developer window 330 to incorporate this application or widget into the electronic form being created.

(5) Image Viewer Components: A text editor component corresponds to a preconfigured application or widget that incorporates an image viewer into the electronic form 155. The image viewer may allow a customer or other user accessing a deployed form to scroll through and/or select one or more images displayed in the image viewer. The user may also be permitted to upload additional images to be included in the image viewer. This image viewer component may be dragged-and-dropped into the developer window 330 to incorporate this application or widget into the electronic form being created.

The template components 314 enable users to reuse or recycle previously created electronic forms 155 and/or portions of previously configured electronic forms 155. For example, the template components 314 may include a previously created login form (e.g., for verifying login information to access accounts) that can be reused across multiple systems simply by dragging-and-dropping the template into the developer window 330. As another example, the template components 314 may include portions of previously created forms that are designed to collect specific types of information (e.g., personal information, financial information, and/or other data) that are commonly used in many types of forms. Thus, rather than repeatedly designing the same input section of form multiple times, a specific input section of the form can be saved as a template component for use across multiple electronic forms 155.

The advanced control components 315 enable users to customize functions of the electronic form 155 relating to controlling workflow, navigation, and event handling. In many cases, the advanced control components may not be visible to customers or users that access completed forms that have been deployed. Rather, the advanced control components 315 can operate as background processes that control aspects of the workflow, navigation, and event handling for the electronic forms 155. Exemplary advanced control components 315 may include:

(1) Decision Components: A decision component can be dragged-and-dropped into the development window 330 to define and customize processes and/or workflows that are executed in the background of the electronic form. For example, a decision component can trigger values and/or parameters associated with certain form components 211 included in the electronic form 155 to be modified based on inputs received via the electronic forms (e.g., to modify aspects of layout components 311, input field components 312, application components 313, template components 314, and/or other advanced control components 315).

In certain embodiments, the actions triggered by the decision component can be defined using a customization interface. For example, a customization interface associated with a decision component can include an input section that enables the user to identify one or more form components 211 that should be read and/or monitored. The components 211 can be monitored in real-time as customers or users are accessing a deployed form and/or filling out the form. The decision component can also include an output section that enables the user to identify one or more form components 211 that should be modified and/or updated based on the inputs received via the one or more components that are identified in the input section. The output section further enables the user to specify actions that should be taken for modifying the components identified in the output section. Exemplary actions that may be selected can include actions for changing form field values, turning on/off the visibility of the components, outputting messages on the form interface, transmitting back-end error messages (e.g., for processing by error handlers), navigating to particular pages or sections of the form, and/or other functions. A logic section enables the user to input control logic and/or specify conditions under which the actions are executed and/or under which the components identified in the output section are modified. Examples of such a customization interfaces are discussed in further detail below.

(2) Navigation Components: A navigation component can be dragged-and-dropped into the development window 330 to enable users to control navigation between portions of the electronic form 155. This component may be particularly useful when dealing with large forms that have many sections, and can enable the electronic form to control which portions of the form should be presented to the users and in which order. For example, a form may include multiple panels or tables that include input fields for collecting information. The navigation component can control the order in which the panels or tables are presented to the user and/or to determine whether certain panels or tables can be skipped (e.g., not presented to the user) based on previously entered information.

(3) Calculator Components: A calculator component can be dragged-and-dropped into the development window 330 to enable calculations to be performed on values input to the components. For example, the calculator component can run in the background and perform calculations on values entered into the input field components 312 and/or other components.

(4) Workflow Components: A workflow component can be dragged-and-dropped into the development window 330 to enable users to define advanced workflows. Like the decision component, the workflow component can be used to define and customize processes and/or workflows that are executed in the background of the electronic form. For example, the workflow component can define background processes which allow values and parameters of certain components to be modified dynamically (e.g., in real-time as a customer is filling out the form) based on values received by other components.

In certain embodiments, this may be accomplished by using a customization interface associated with the workflow component to create node diagrams that defines the background processes. For example, the workflow component can enable users to generate a diagram that includes input nodes, processing nodes, and output nodes. The input nodes identify components that are monitored for receiving inputs. Data received via the input nodes can be mapped to one or more processing nodes that can be configured to perform various operations (e.g., such as aggregating the received data, filtering the received data, performing natural language processing operations on the received data, merging the received data, sorting the received data, adding new input fields or components to the form being created, modifying layout or designs or the forms, etc.). The one or more processing nodes can also be mapped to one or more output nodes (e.g., that correspond to components of the electronic form that can be modified and/or which can output the data based on the processing operations) to update the electronic form. Examples of such a customization interfaces are discussed in further detail below.

(5) Transform Components: Transform components can be dragged-and-dropped (or otherwise inserted) into the development window 330 to enable inputs received via an electronic form to be transformed, manipulated, and/or processed in various ways. For example, a transform integrated into an electronic form 155 can execute a background process that performs functions associated with reformatting, recasting, and/or concatenating data that is received via the electronic form 155. In some cases, the transform components can be configured to assist with performing data integration and/or data migration functions by converting the inputs and/or data received from an end-user (e.g., a customer) via the electronic form 155 into an appropriate format for storage in particular databases and/or for use with particular applications (e.g., proprietary third-party system 130 applications). As explained below, in certain embodiments, the transform components can also be integrated into workflows and/or processes that are defined by the workflow components.

The system components 316 can include custom modules and/or components that are created by developers that utilize and access the development and deployment platform 150. For example, a developer can create a module and/or component, and the module and/or component can then appear as an option on the form generation interface 301 (e.g., in the components menu 320) to enable that developer, as well as other developers who access the development and deployment platform 150, to create and/or update electronic forms 155.

In certain embodiments, the system components 316 can be created by adding various form components 211 (e.g., layout components 311, input field components 312, application components 313, etc.) into the development window 330 to define the system components 316. When a user has finished customizing a system component 316, the user can select the save option 340, which may prompt the user to specify whether the current settings of the development window 330 should be saved as an electronic form 155 (e.g., which can then be provided to end-users based on the saved settings) or whether the current settings of the development window 330 should be saved as a system component 316 (e.g., which can then be provided to developers for use in developing electronic forms). In response to selecting the latter option, the settings of the development window 330 will be saved as a system component 316. Once saved, the stored system component 316 can be then be accessed by the developer (and other developers) via the form generation interface 301 for use in creating electronic forms 155.

The exemplary components described above are not intended to be an exhaustive listing of all components made available via the development toolkit 210. It should be understood that other types of layout components 311, input field components 312, application components 313, template components 314 and/or advanced control components 315 can be provided by the development toolkit 210 described herein.

The development window 330 can represent a portion of the form generation interface 300 that is used to define and/or visualize the electronic form 155 being generated or modified. In certain embodiments, the development window 330 can be configured to display the electronic form 155 being created and/or modified in a WYSIWYG ("what you see is what you get") editor or format. Generally speaking, a WYSIWYG editor enables the user creating and/or modifying an electronic form 155 to see what the electronic form 155 will look like while the electronic form 155 is being created and/or modified. For example, as layout components 311, input field components 312 and other components are added to the development window 330, the WYSIWYG functionality of the development window 330 enables the user to view how the components will appear when the electronic form 155 is displayed and deployed.

As mentioned above, the components in the components menu 320 can be dragged-and-dropped into the development window 330. The development window 330 can be configured to detect when a component is being dragged-and-dropped into the development window 330. This may include detecting events in real-time (e.g., using HTML and/or JavaScript attributes such as "onmouseover" and/or "onmouseup") as the electronic form 155 is being created. The development window 330 can also be configured to identify the particular type of component (e.g., to detect whether the component is for a text field input or a decision component) that is being added to the electronic form 155 and to insert the component into the electronic form 155 (e.g., to insert the component into the WYSIWYG editor provided by the development window 330). Inserting of the component into the electronic form can include incorporating code and/or programming instructions into the electronic form 155 which enables content and/or functionality associated with the component to be integrated into the electronic form 155. The development window 330 (or other portion of the interface 300) can be configured with instructions that determine how the code corresponding to the components that are dragged-and-dropped into the development window 330 are to be inserted into the electronic form 155 being created. As discussed in further detail below, each component can include a customization interface that enables the users to customize various aspects of the components. After a user has completed an electronic form 155, the user can select the save option 340 to save the electronic form to a database 240.

The exemplary form generation interface 300 also includes a version control option 350 for accessing the features and functionality associated with the version control component 250. In certain embodiments, in response to selecting the version control option 350, the form generation interface 300 may display a version history timeline 260 that includes a listing of versions 280 for an electronic form 155 and/or other form component, and which enables various actions to be executed (e.g., such as restoring a previous version 280, comparing two or more versions 280, viewing any of the stored versions of the electronic form 155, etc.). These functions are described in further detail below.

The exemplary form generation interface 300 described above with reference to FIG. 3 is not intended to be limiting and it should be understood that the interface and associated functionality can be modified in various ways without departing from the principles of this disclosure. For example, in certain embodiments, the components in the components menu 320 can be added to the electronic form 155 being created and/or modified in ways other than dragging-and-dropping the components into the development window 330 (e.g., such as by selecting buttons or hyperlinks to add the components). Likewise, components other than those explicitly described can be used to create and/or modify the electronic forms 155.

FIGS. 4-8 and 9A-9B illustrate exemplary customization interfaces that may be associated with the form components 211. As mentioned above, each of the form components 211 (e.g., including the layout components 311, input field components 312, application components 313, template components 314, and/or advanced control components 315) can be associated with a customization interface that enables the users creating and/or modifying the electronic forms 155 to customize various aspects of the components (e.g., aspects relating to parameters, values, visibility, functionality, etc.). Each of the customization interfaces can include one or more text fields, check boxes, radio buttons, and/or other input options for that enable non-technical users with no programming knowledge to customize the components. The customization interfaces can be accessed via the form generation interface 300. For example, the customization interfaces may be displayed automatically each time a component is added to the development window 330. Also, after the components are added to the development window 330, the components may be displayed in the development window 330 with options or buttons that can be selected to access the customization interfaces. After a user has finished customizing the component using a corresponding customization interface, the user can select a save option or button to save the settings for the component and to incorporate the settings into the electronic form 155 being created and/or modified. The user can additionally select a save template option to create a template that includes the settings for the component.

Figure 5:
FIG. 5 is an exemplary customization interface for a checkbox component in accordance with certain embodiments.

FIGS. 4 and 5 disclose exemplary interfaces that can be provided in connection with certain input field components 312. More specifically, FIG. 4 is an exemplary customization interface 400 that can enable a user to customize a text field component in accordance with certain embodiments, and FIG. 5 is an exemplary customization interface 500 that can enable a user to customize a checkbox component in accordance with certain embodiments.

Figure 6:
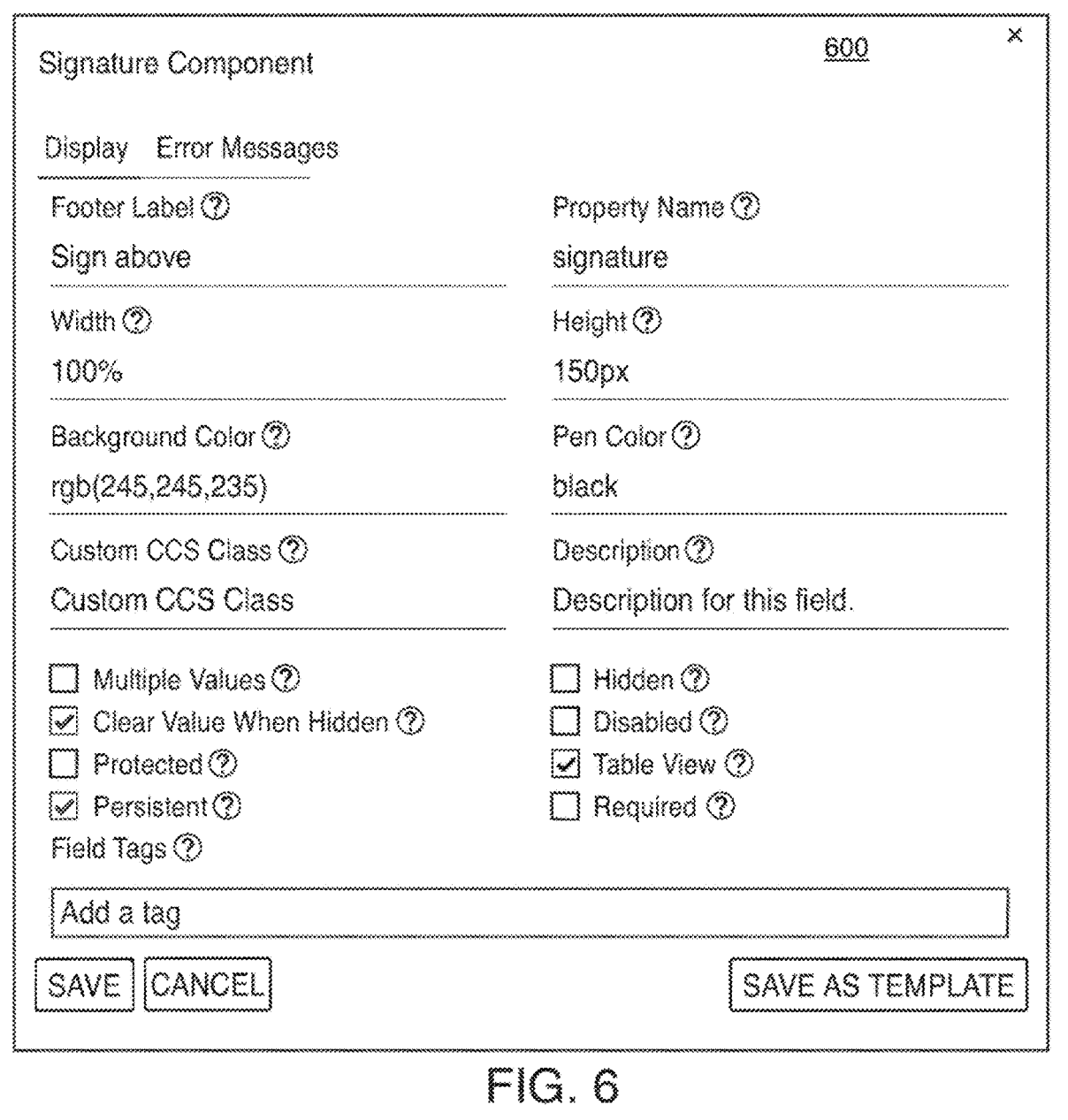

FIGS. 6 and 7 disclose exemplary interfaces that can be provided in connection with certain application components 313. More specifically, FIG. 6 is an exemplary customization interface 600 that can enable a user to customize an e-signature component in accordance with certain embodiments, and FIG. 7 is an exemplary customization interface 700 that can enable a user to customize a date selector component in accordance with certain embodiments.

Figure 9A:
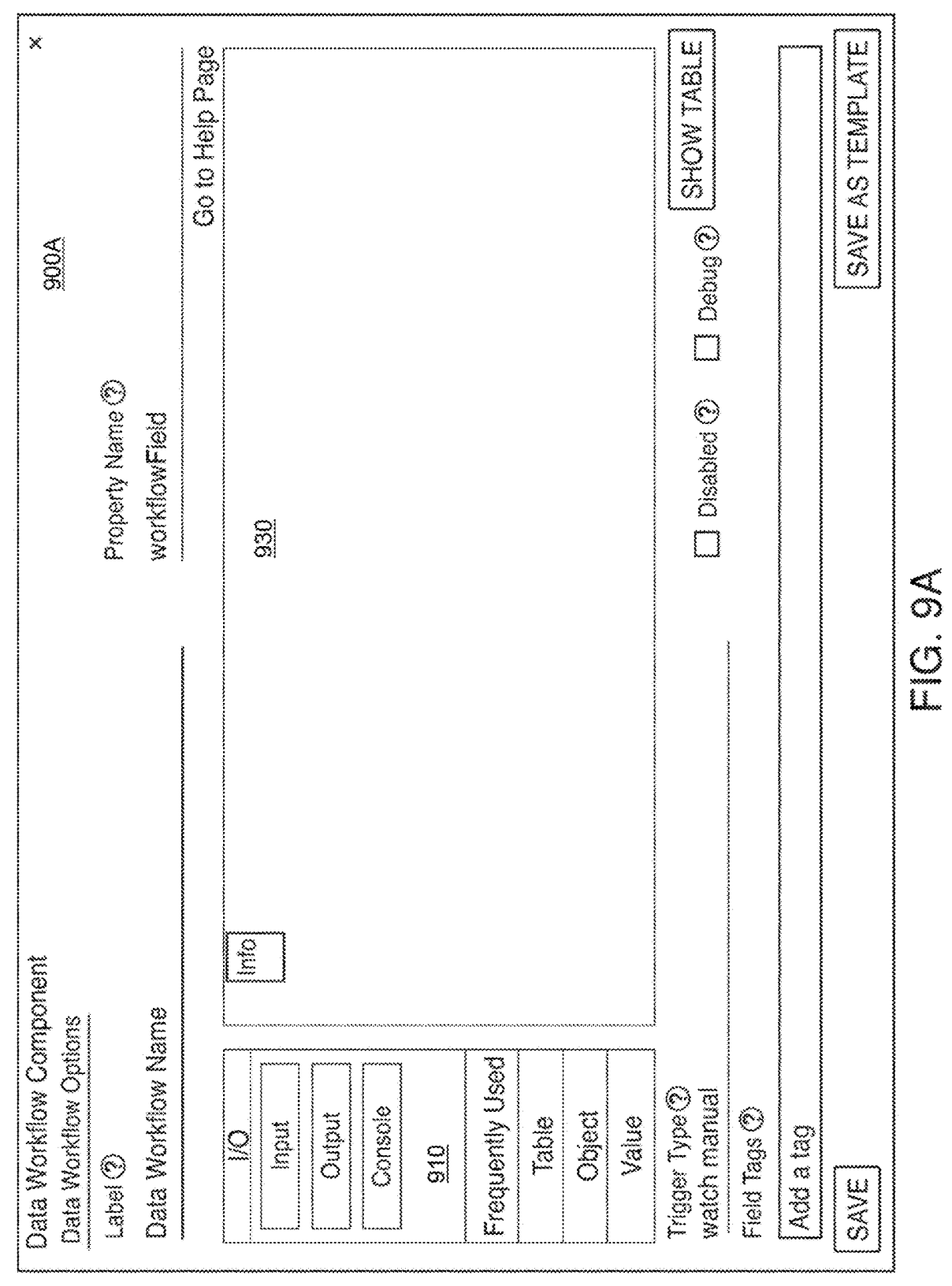
Figure 9B:
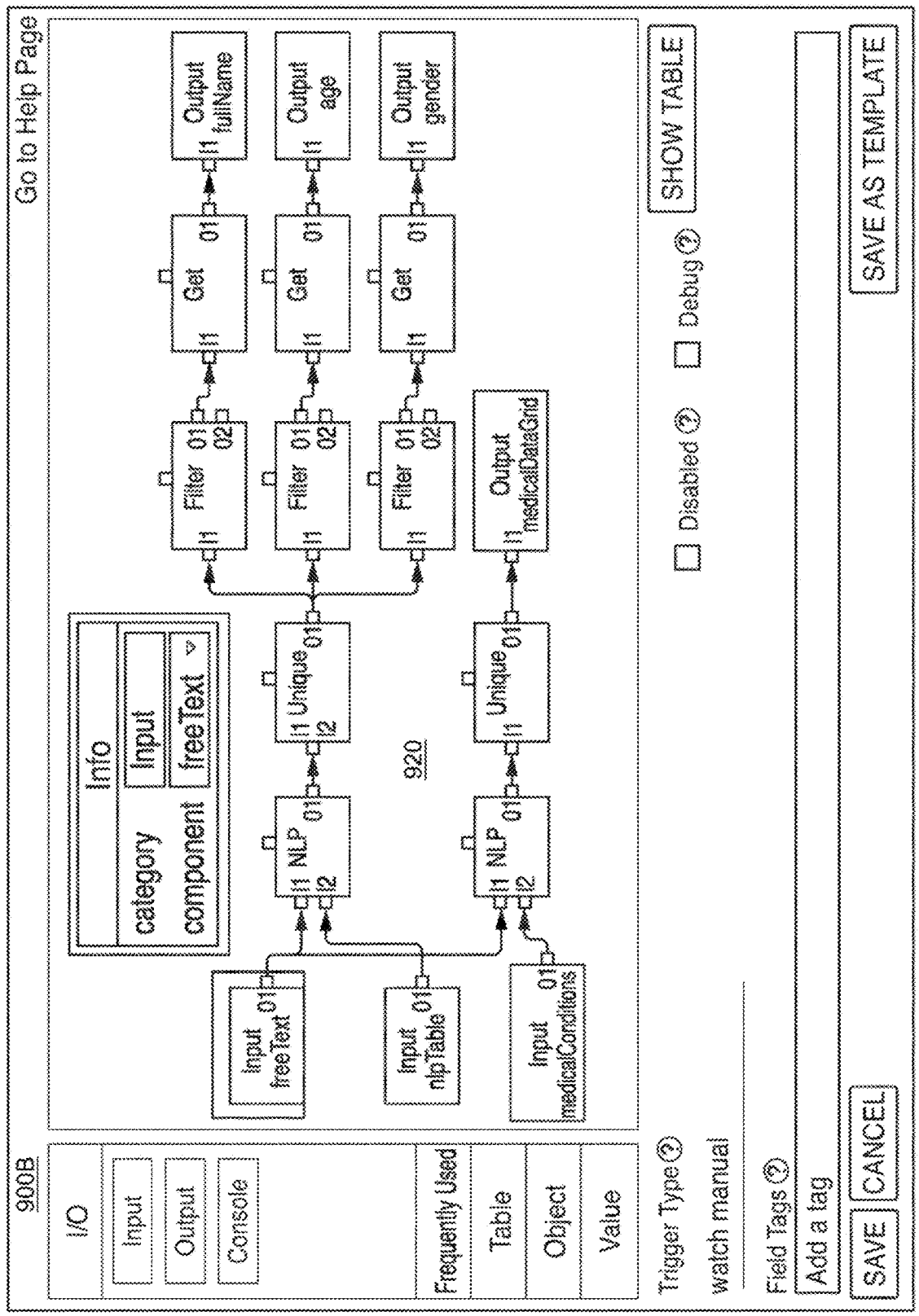
FIG. 9B is another exemplary customization interface for a workflow component in accordance with certain embodiments.

FIGS. 8 and 9A-9B disclose exemplary interfaces that can be provided in connection with certain control components 315. More specifically, FIG. 8 is an exemplary customization interface 800 that can enable a user to customize a decision component in accordance with certain embodiments, and FIGS. 9A-9B are exemplary customization interfaces 900A and 900B that can enable a user to customize for a workflow component in accordance with certain embodiments.

As can be seen in FIGS. 4-8 and 9A-9B, while the interfaces may include similar parameters for customizing the components, the parameters presented on each of the customization interfaces can also vary. Some common customization parameters presented on the interfaces may include:

(1) Label: This may represent the label (e.g., text string) that appears next to the component in the electronic form 155.

(2) Property name: The name of the component (e.g., such as the "name" parameter used in an HTML input element). This name may be used to reference the component via the electronic form 155 and/or the API created for the electronic form 155.

(3) Input Mask: This allows users to ensure input is received in a specific or pre-defined format. For example, the users may specify that inputs received via a component are to be in numeric form, alphabetical form, and/or alphanumeric form.

(4) Prefix: Text that is displayed before a component (e.g., "$" or "@" that is displayed before an input field).

(5) Suffix: Text that is displayed after a component (e.g., ".com").

(6) Protected: A protected field will not be returned when queried via an API.

(7) Persistent: A persistent filed will be stored in a database (e.g., database 240) when the electronic form 155 is submitted by a customer or other user.

(8) Hidden: Indicates that a component or field should be hidden (e.g., such that it is not visible to a customer or other user filling out the form).

(9) Disabled: Indicates that a field or component should be disabled (e.g., such that input cannot be entered).

(10) Required: Indicates that a field or component must be filled in before the electronic form 155 be submitted by a customer or other user.

(11) CSS Class: Allows the user creating and/or modifying the form to associate a custom cascading style sheet (CSS) class with a field or component.

(12) Description: Text that will appear below or near the component or input field (e.g., which describes the component or input field to a customer or user filling out the form).

(13) Trigger: Identifies a component that should be triggered or executed.

For example, this may identify a component that uses the input from a field or component to execute a process or perform an operation.

(14) On Keypress: Identifies a component that should be triggered or executed in response to detecting a key press event.

(15) Clear Value When Hidden: Indicates that a value of a field or component should be cleared when the field or component is hidden.

(16) Tooltip: Allows a tooltip (e.g., a message that appears when a cursor is positioned over the field or component) to be associated with a field or component.

(17) Minimum Length: Indicates a minimum number of characters that must be entered into a field or component.

(18) Maximum Length: Indicates a maximum number of characters that must be entered into a field or component.

(19) Field Tags: Allows users to specify one or more tags (e.g., textual labels or names) to be associated with a field or component.

(20) Width: Indicates the width of the component or field (e.g., in pixels, percentage, and/or inches).

(21) Height: Indicates the height of the component or field (e.g., in pixels, percentage, and/or inches).

(22) Background Color: Indicates the background color of the field or component (e.g., using hex codes).

The customization parameters mentioned in this disclosure are intended to be exemplary and are not intended to be an exhaustive listing. It should be understood that other types of customization parameters can also be utilized.

It should also be understood that the customization parameters associated with the application components 313, advanced control components 315, and other similar types of components that enable more complex functionality to be incorporated into the electronic forms 155 can include customization parameters that are specific to implementing such functionality. For example, as shown in FIG. 6, the customization interface 600 for an e-signature component can include customization parameters that allow for customization of signature color. Likewise, as shown in FIG. 7, the customization interface 700 for a data selector component may include customization parameters for specifying a date format (e.g., which allows users to specify a format for displaying the date) and which allows the dates of a calendar to be restricted to certain ranges. Similar types of customization parameters can be presented for the application components 313.

The interface 800 illustrated in FIG. 8 demonstrates the functionality of an exemplary decision component that can be incorporated into an electronic form 155. An input section 810 (labeled "Inputs") of the interface allows the user to identify one or more components that have been added to the electronic form 155. Any components identified in the input section 810 can be monitored in real-time when the electronic form 155 is deployed. For example, in the event that a customer is filling out the electronic form 155, any inputs (e.g., text inputs, click inputs, etc.) received via a component identified in the input section will be detected immediately. Each component that is monitored is listed on a different row of the table for the input section in the "Id" column. The user can select options in the "type" indicating the types of inputs that will trigger the decision component (e.g., whether an "exact" input will trigger the input component or whether an input falling in a specific "range" will trigger the input component). The user can also select options that indicate whether the input is "required" (e.g., which can indicate whether the input is required for validating the form) and/or "silent" (e.g., indicating that the component identified in the input section 810 is triggered by an execute command rather than being monitored for changes).

The output section 820 on the interface 800 (labeled "Outputs") allows the user to identify the components of the electronic form 155 that can be modified by the decision component. For example, the decision component can be used to modify various parameters or aspects of input fields, hidden values, application components layout components, navigation components, etc. Each row corresponds to a specific component identified in the "Id" column. The "type" column identifies the action or operation that should be performed for modifying the components identified in the output section 820. In certain embodiments, the user can select one or more of the following actions:

(1) Value: allows the value of an identified component to be changed;

(2) Message: allows a pop-up message or window associated with the identified component to be output;

(3) Steps: automatically skips ahead to other pages or interfaces of the electronic form which correspond to the identified component and/or which are identified by a navigation component;

(4) Label: changes the label associated an identified component;

(5) Visible: allows the visibility of an identified component to be turned on/off (e.g., by dynamically adding or removing the identified component from the interface displaying the electronic form);

(6) Pop Error: generates an error message on the back-end that notifies an identified component (e.g., which notifies an error handler to take corrective actions);

(7) Navigation: automatically navigates to a different portion of the electronic form corresponding to an identified component; and (8) Focus: automatically focuses attention on an identified component of the electronic form.

The actions described above are intended to be exemplary and are not intended to provide an exhaustive listing of all actions that can be taken. Other types of actions can also be selected and associated with the components identified in the output section 820.

A logic section 830 (labeled "Micro Decision") of the interface 800 enables logic and/or conditions to be specified by the user indicating if and when the actions identified in the output section should be executed in connection with the components identified in the output section 820. The manner in which the logic and/or conditions are specified may vary. For example, in certain embodiments, as components are added to the input section and the output section 830, the table associated with the logic section may automatically be updated to include columns corresponding to the components. Columns may also be added which concatenate the values of the "id" and "type" columns in the output section. The user can then specify values of the components in the input section that will trigger the actions to be taken by the components identified in the output section. Regardless of how the logic section is configured, the logic section 830 enables non-technical users to correlate inputs received from components in the input section 810 to actions and/or changes that are to be implemented for the components identified in the output section 820.

A testing section 840 enables a user to perform testing on the settings specified in the input section 810, output section 820, and logic section 830. For example, the user can hit the execute button near the testing section 840 to view values that would be returned based on the settings in these sections.

The customization interfaces 900A and 900B in FIGS. 9A and 9B demonstrate the functionality of an exemplary workflow component that can be incorporated into an electronic form 155. FIG. 9A shows a blank customization interface 900A for an exemplary workflow component, and FIG. 9B shows a customization interface 900B for an exemplary workflow component that includes a node diagram 920 that has been created by a user. To design the node diagram 920, users can drag-and-drop input nodes, output nodes, and processing nodes from the diagram menu 910 into a diagram development window 930. The users can then specify options for mapping the nodes to one another.

For example, with reference to FIG. 9B, the user has added three input nodes to the diagram 920. The three input nodes may correspond to input field components and/or other components added to the electronic form being created. By adding the input nodes to the diagram, the components corresponding to the input nodes will be monitored in real time as the electronic forms are being filled out. The user has also added a variety of processing nodes, each of which is configured to perform a specific function. For example, processing nodes have been added which include: NLP nodes (e.g., for performing natural language processing operations on the inputs received form the input nodes), filter nodes (e.g., for filtering data from the input nodes and/or upstream processing nodes), nodes for creating a unique table (e.g., for storing and/or organizing data from the input nodes and/or upstream processing nodes), and nodes for performing get operations (e.g., to retrieve data from tables that were created). The settings for each of the processing nodes can be customized by the users (e.g., to define the NLP, filtering table creation, and get operations being performed). The user has also added four output nodes. The four output nodes may correspond to input field components and/or other components added to the electronic form being created. The output nodes will be configured to output data (e.g., to modify filed values) and/or execute actions based on the operations specified in the diagram 920. The diagram 920 displays how the user mapped the nodes to one another to control the flow of information from the input nodes to the output nodes (after passing through various processing nodes).

In the exemplary diagram 920 shown on the interface 900B in FIG. 9B, the workflow component is utilized to design a transcription tool for use by a medical doctor and/or other type of medical practitioner. The three input nodes can correspond to text area fields or other input fields that receive patient information (e.g., which may be input by keyboard and/or transcribed from voice inputs). The NLP nodes may process the inputs received via the input nodes and insert the data into a unique table created by the unique table nodes (labeled "Unique"). Some of the data may be filtered (e.g., by the filtering nodes) to detect information such as gender, age, and name. Get operations can then retrieve data from the tables and provide this data to the output components. The output components can correspond to fields or other features of the electronic form 155 that are updated with information retrieved using the get information. Thus, in this example, a user is able to configure an electronic form that provides a transcription application without any technical knowledge and simply by designing a diagram 920 on a GUI.

The exemplary diagram 920 shown in FIG. 9B is just one example of how the diagram 920 can be utilized to incorporate advanced functionalities into the electronic forms 155. It should be apparent the nodes can be inserted into the diagram in various ways to allow processing of inputs received by components and mapping of outputs to other components. Various form-related applications can be designed using the workflow component.

Also, the aforementioned processing nodes are mentioned as examples of nodes that can be inserted into the diagram 920. Many other types of processing nodes may also be inserted into the diagram including, but not limited to the processing nodes that can be configured to perform operations such as filtering data, selecting data, sorting data, deleting data, mapping data (e.g., mapping data to tables), merging data, appending data, parsing data, and/or other types of operations.

Figure 10:
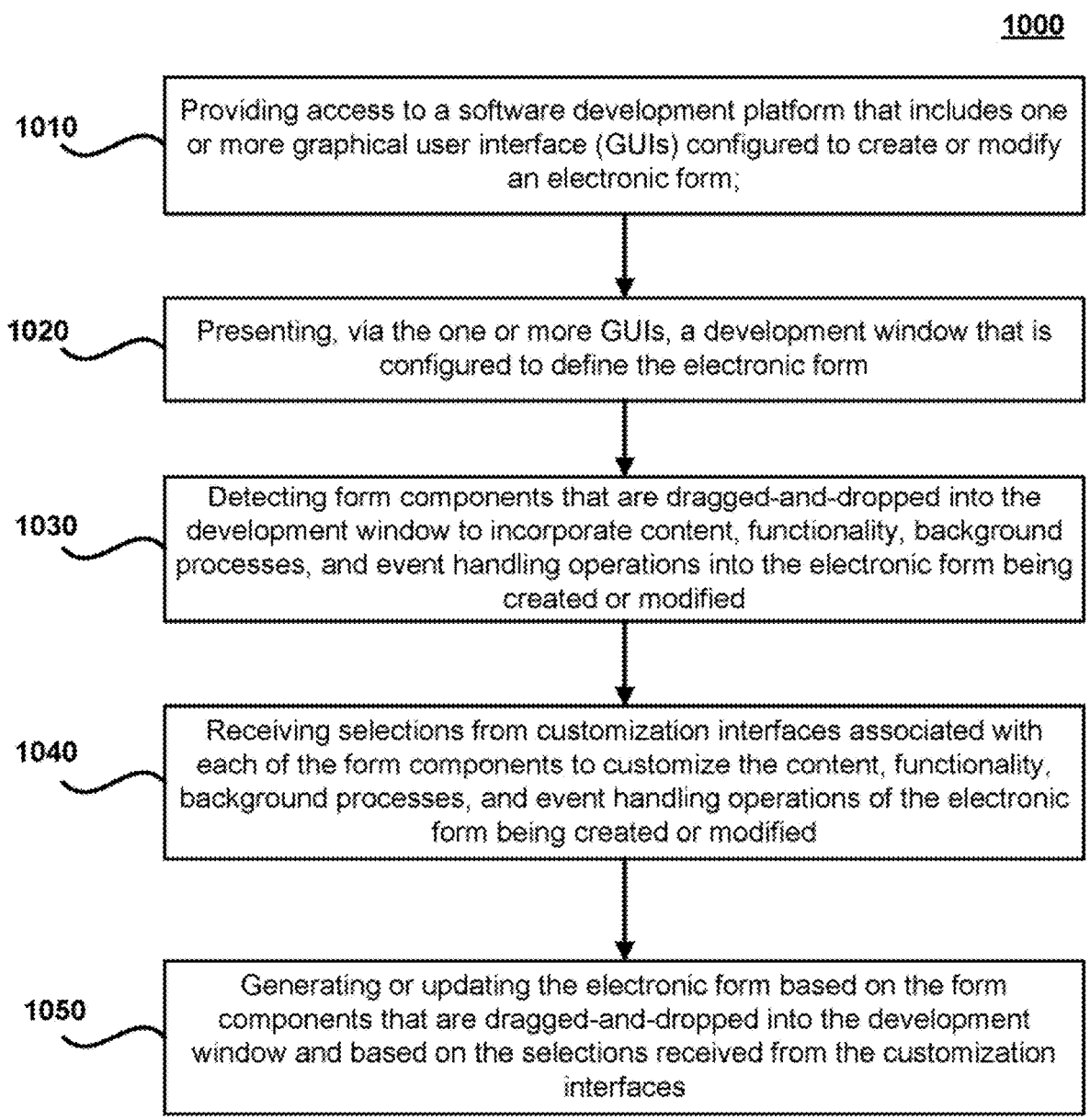
FIG. 10 is a flow chart of an exemplary method for creating an electronic form in accordance with certain embodiments.

FIG. 10 is a flow chart of an exemplary method 1000 for creating an electronic form 155 in accordance with certain embodiments of the present invention. The exemplary method 1000 may be executed in whole or in part by the development and deployment platform 150 (e.g., using the development toolkit 210 and/or form generation interface 300). For example, one or more storage devices 201 can store instructions for performing the steps of method 1000, and one or more processors 202 can be configured to execute performance of the steps of method 1000.

In step 1010, access is provided to a software development platform 150 that includes one or more graphical user interfaces (GUIs) configured to create or modify an electronic form 155. In certain embodiments, a user may access the platform over a network 160 and/or directly via a local device. In certain embodiments, the user may utilize a web browser and/or local application to access the platform. The one or more GUIs may include the form generation interface 300 illustrated in FIG. 3 and/or the customization interfaces illustrated in FIGS. 4-8 and 9A-9B.

In step 1020, a development window 330 that is configured to define the electronic form may be presented via the one or more GUIs. In certain embodiments, the development window 330 may be implemented as a WYSIWYG editor and/or in a WYSIWYG format that enables the user creating and/or modifying an electronic form 155 to see what the electronic form 155 will look like while the electronic form 155 is being created and/or modified.

In step 1030, form components that are dragged-and-dropped into the development window 300 are detected to incorporate content, functionality, background processes, and event handling operations into the electronic form 155 being created or modified. The form components may be displayed on a menu (e.g., component menu 320) and may include layout component 311, input field components 312, application components 313, template components 314, and/or advanced control components 315. The background processes may be defined by the decision component and/or workflow component described above. The background processes may include application and/or sub-routines which run in the background of a browser and/or application when the form is accessed by customers or other users.

In step 1040, selections are received from customization interfaces associated with each of the form components to customize the content, functionality, background processes, and event handling operations of the electronic form being created or modified. As discussed above (e.g., with respect to FIGS. 4-8 and 9A-9B), each of the customization interfaces can present a plurality of customization parameters for customizing the form components.

In step 1050, the electronic form 155 is generated or updated based on the form components that are dragged-and-dropped into the development window and based on the selections received from the customization interfaces.

Figure 11:
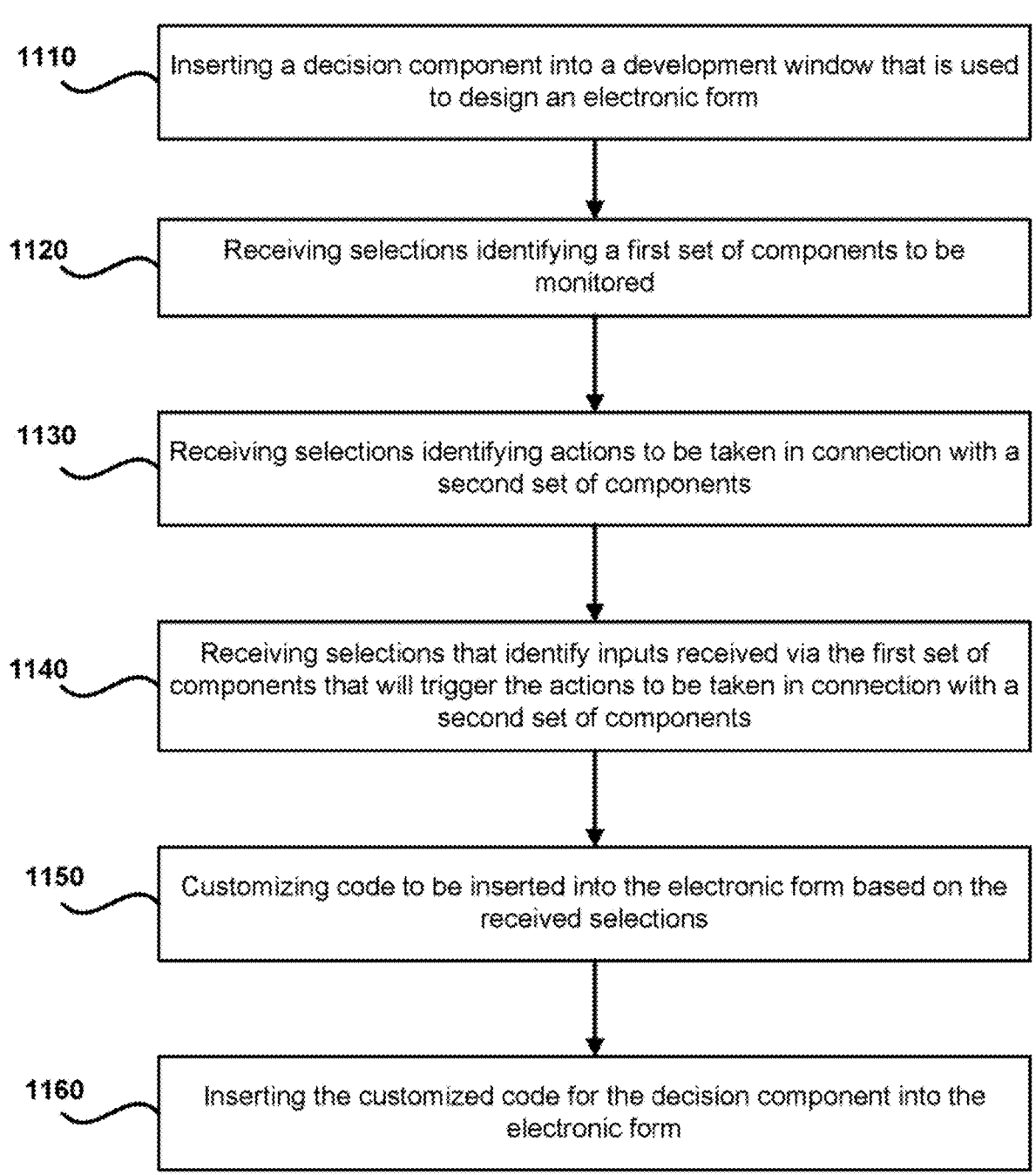
FIG. 11 is a flow chart of an exemplary method for adding a decision component to an electronic form in accordance with certain embodiments.

FIG. 11 is a flow chart of an exemplary method 1100 for adding a decision component to an electronic form in accordance with certain embodiments of the present invention. The exemplary method 1100 may be executed in whole or in part by the development and deployment platform 150 (e.g., using the development toolkit 210 and/or form generation interface 300). For example, one or more storage devices 201 can store instructions for performing the steps of method 1100, and one or more processors 202 can be configured to execute performance of the steps of method 1100.

In step 1110, a decision component is inserted into a development window 330 that is used to design an electronic form 155. In step 1120, selections are received for identifying a first set of components to be monitored. For example, as mentioned above, a customization interface associated with a decision component may include an input section 810 for identifying form components (e.g., input field components 312, application components 313, etc.) to be monitored. In step 1130, selections are received for identifying actions to be taken in connection with a second set of components. For example, the customization interface associated with a decision component can include an output section 320 that identifies components that should be modified and/or actions to be taken in connection with such components. In step 1140, selections are received that identify inputs received via the first set of components that will trigger the actions to be taken in connection with a second set of components. The selections may be received via the logic section 830 of the customization interface for the decision component. In step 1150, code (e.g., programming code, logic and/or computing instructions) to be inserted into the electronic form 155 is customized based on the received selections (including the selections received in steps 1120, 1130 and 1140). In step 1160, the customized code for the decision component is inserted into the electronic form 155.

FIGS. 12-22 discloses exemplary interfaces, processes, functions, and features associated with implementing the version control component 250 in accordance with certain embodiments. Any of the interfaces, processes, functions, and features described in connection with these figures may be provided by the version control component 250.

Figure 12:
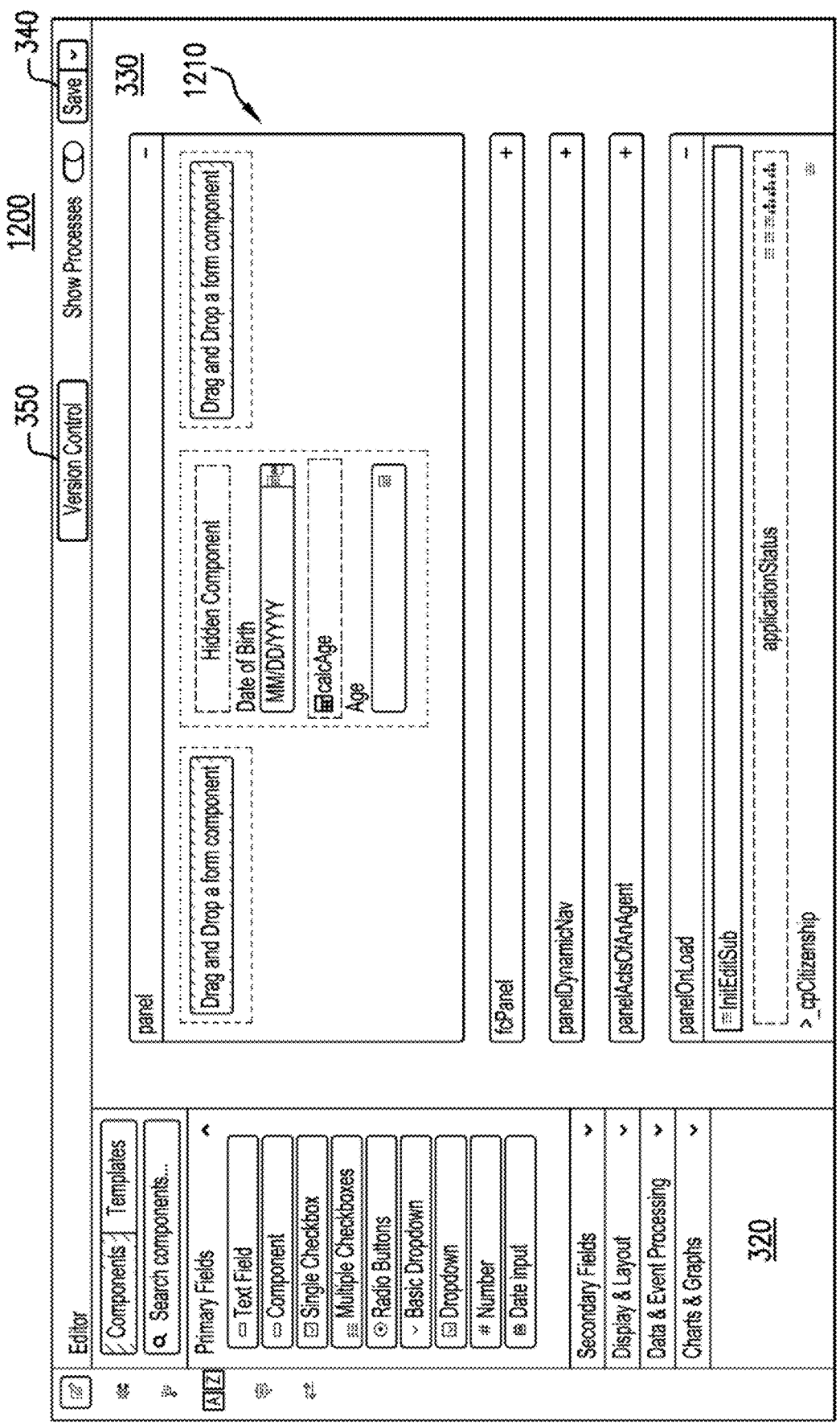
FIG. 12 is another exemplary interface for creating and updating electronic forms in accordance with certain embodiments.

FIG. 12 is another exemplary form generation interface 1200 for creating and updating electronic forms in accordance with certain embodiments. Similar to FIG. 3, the form generation interface 1200 includes a components menu 320 that enables various form components 211, such as layout components 311, input field components 312, application components 313, template components 314, advanced control components 315, system components 316, and/or other components, to be incorporated into electronic forms 135 via the development window 330. An electronic form 155 can be generated or updated by inserting (e.g., dragging-and-dropping and/or otherwise selecting) the form components 211 from the components menu 320 into the development window 330, and/or by customizing inserted form components 211 within the development window 330 (e.g., using customization interfaces shown in FIGS. 4-8, 9A-9B, and 16A-16C).

When a user is finished creating and/or updating an electronic form 155, the user may select a save option 340 to save a new version of the electronic form 155. Each new version of the electronic form 155 may be saved with information identifying the user who created and/or updated the version 280 of the electronic form 155, as well as a timestamp (e.g., which indicates the date and time the new version was created or updated) and any comments or notes that describe or relate to the version. Any or all of the information and data saved and/or associated with stored versions may be utilized to facilitate searching (e.g., keyword searches) on the stored versions. In certain embodiments, the interface may additionally, or alternatively, be configured to automatically save new versions 280 of electronic forms 155 in response to detecting revisions or updates being made to an electronic form 155. In certain embodiments, each time a new version 280 of the electronic form 155 is saved (e.g., either by selection of save option 340 or automatically), the new version becomes the current version of the electronic form 155.

In many cases, a user creating and/or updating an electronic form 155 may desire access to one or more previously stored versions 280 of the electronic form 155. For example, a user may desire access to a previous version 280 of the electronic form 155 that functioned properly before certain updates were made which caused the electronic form 155 to fail or malfunction. In these and other scenarios, the user may access all stored versions of the electronic form 155 by selecting the version control option 350 included on the interface.

Figure 13:
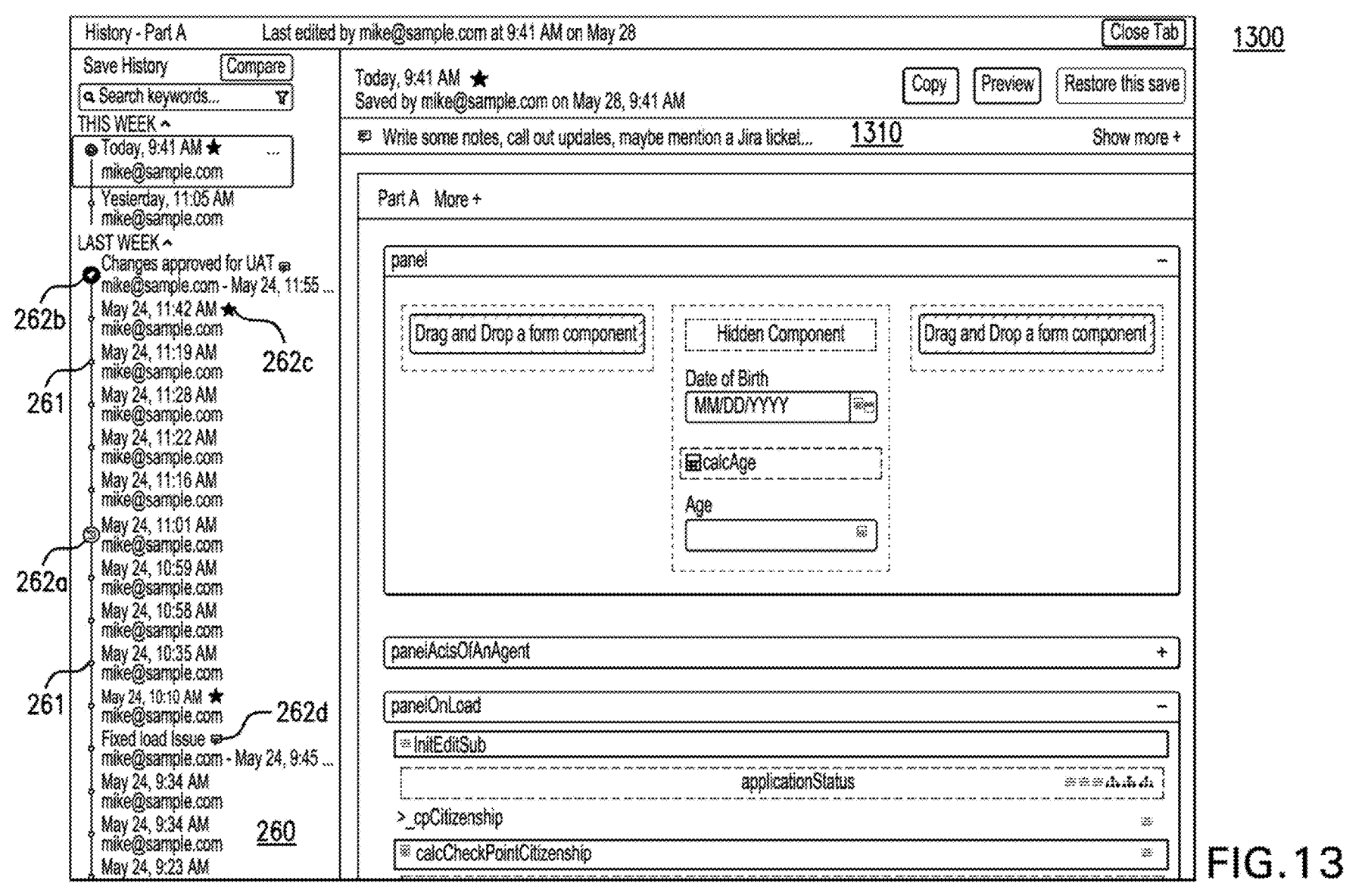

FIG. 13 is an exemplary interface 1300 that enables version control functions to be performed in accordance with certain embodiments. This exemplary interface 1300 may be displayed in response to, or after, selection of the version control option 350. The interface 1300 provides a version history timeline 260 directly in the GUI-based environment that is used to create and update the electronic form 155 (e.g., on the same interface as the development window 330 that is used to create and/or update electronic forms 155). The exemplary version history timeline 260 includes a plurality of entries 261, each of which corresponds to a stored version 280 of the electronic form 155. The version history timeline 260 may display the versions 280 of the electronic form 155 in a chronologically-ordered listing.

In certain embodiments, in response to selecting an entry 261 in the version history timeline 260, the development window 330 is automatically updated to reflect the stored settings associated with the version 280 corresponding to the entry 261. For example, selection of an entry 261 may cause the development window 330 to display layout components 311, input field components 312, application components 313, template components 314, and/or advanced control components 315 in a WYSIWYG format in accordance with the settings associated with the stored version. As explained in further detail below, the selection of entry also enables various functions (e.g., comparing, restoring, editing, etc.) to be performed in connection with the version 280.

Certain entries 261 included in the version history timeline 260 may be annotated with indicators 262 corresponding to the entries 261. For example, a restore indicator 262*a* may indicate that a version 280 of the electronic form 155 included in the version history timeline 260 corresponds to a previously stored or archived version 280 of the electronic form 155 that was restored as the current version of the electronic form 155 at some point in time. Thus, the restore indicator 262*a* may identify when the electronic form 155 was rolled back to a previous version 280.

A promotion indicator 262*b* may indicate that a version was "promoted" by a user creating or updating an electronic form 155. A user may assign a promotion indicator 262*b* to a version of an electronic form 155 for various reasons (e.g., to flag it for review by another user). A star indicator 262*c* may indicate that a version was highlighted by a user creating or updating an electronic form 155. A user may assign a star indicator 262*c* to a version 280 of an electronic form 155 for various reasons (e.g., to identify a version of the electronic form 155 that functions properly and/or which can be used to restore a functional version of the electronic form). A comments indicator 262*d* may indicate that comments have been provided or input for a version 280 of the electronic form 155. For example, a user creating or updating an electronic form 155 may provide comments in a comments section 1310 and those comments can be made available to any other users who are collaborating to create, update, and/or review the electronic form 155. Exemplary comments may describe revisions that were incorporated into the version 280 and/or further revisions that should be implemented. When comments are provided for a version 280 of the electronic form 155, the comments indicator 262*d* may appear adjacent to the corresponding entry in the version history timeline 260.

A user can also search for the versions of the electronic form that are stored by the version control component 250. For example, a search option is (located above the version history timeline 26) can be selected to search the stored versions 280 using a variety of filters, including filters that enable searching based on keywords (e.g., words included in the names, titles, and/or actual content of the versions), creator, dates of creation or updates, etc. This search feature can be particularly useful in scenarios in which there are many stored versions 280 of an electronic form 155 and/or in which a user wishes to identify all versions he or she created or updated.

As mentioned above, the version control component 250 may perform functions for managing multiple versions of other components (e.g., such as template components, transform components, workflow components, data models, system components, etc.) that are accessible via the deployment and development platform 150. In performing such version control functions, the version control component 250 may generate version history timelines 260 in the same manner (e.g., by displaying a chronological ordering of versions for these components on an interface) and the same types of indicators 262 (e.g., restore indicators 262*a*, promotion indicators 262*b*, star indicators 262*c*, and/or comment indicators 262*d*) may be included in such timelines 260.

Figure 14:
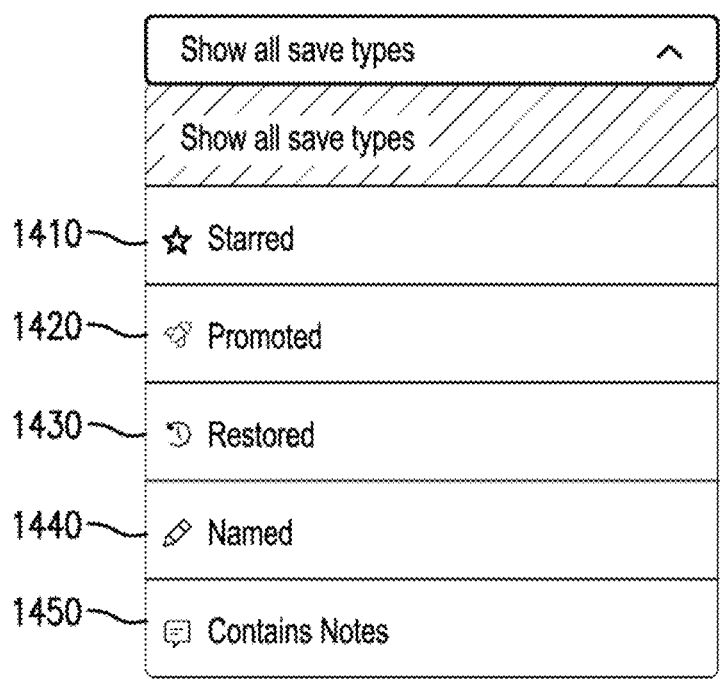
FIG. 14 is an exemplary menu that may be displayed in accordance with certain embodiments.

FIG. 14 is an exemplary menu 1400 that may be displayed in accordance with certain embodiments. In certain embodiments, the menu 1400 may be displayed in response to a selection of a save option 340. The menu 1400 enables a user to customize the manner in which a version 280 of an electronic form 155 is saved or archived, and presented in the version history timeline 260. The same menu may be displayed to customize the manner in which versions 280 of other form components 211 (e.g., such as template components, transform components, workflow components, data models, system components, etc.) are stored and managed by the version control component 250.

A first option 1410 in the menu 1400 enables a version 280 of the electronic form 155 to be saved as a "starred" version, and may cause a star indicator 262*c* to appear adjacent to the corresponding entry 261 in the version history timeline 260. A second option 1420 in the menu 1400 enables a version 280 of the electronic form 155 to be saved as a "promoted" version, and may cause a promotion indicator 262*b* to appear adjacent to the corresponding entry 261 in the version history timeline 260. A third option 1430 in the menu 1400 enables a version 280 of the electronic form 155 to be saved as a "restored" version, and may cause a restore indicator 262*a* to appear adjacent to the corresponding entry 261 in the version history timeline 260. A fourth option 1440 in the menu 1400 enables a version 280 of the electronic form 155 to be saved as a "named" version, and may enable a user to specify a title or name for a corresponding entry 261 in the version history timeline 260. A fifth option 1450 in the menu 1400 enables a version 280 of the electronic form 155 to be saved with one or more comments, and may cause a comments indicator 262*d* to appear adjacent to the corresponding entry 261 in the version history timeline 260.

It should be noted that certain embodiments may enable a user to select more than one option in the menu 1400, and each entry 261 in the version history timeline 260 can be appended with appropriate indicators associated with the selected options. For example, as shown in FIG. 13, certain entries 261 are appended with more than one indicator 262.

Figure 17:
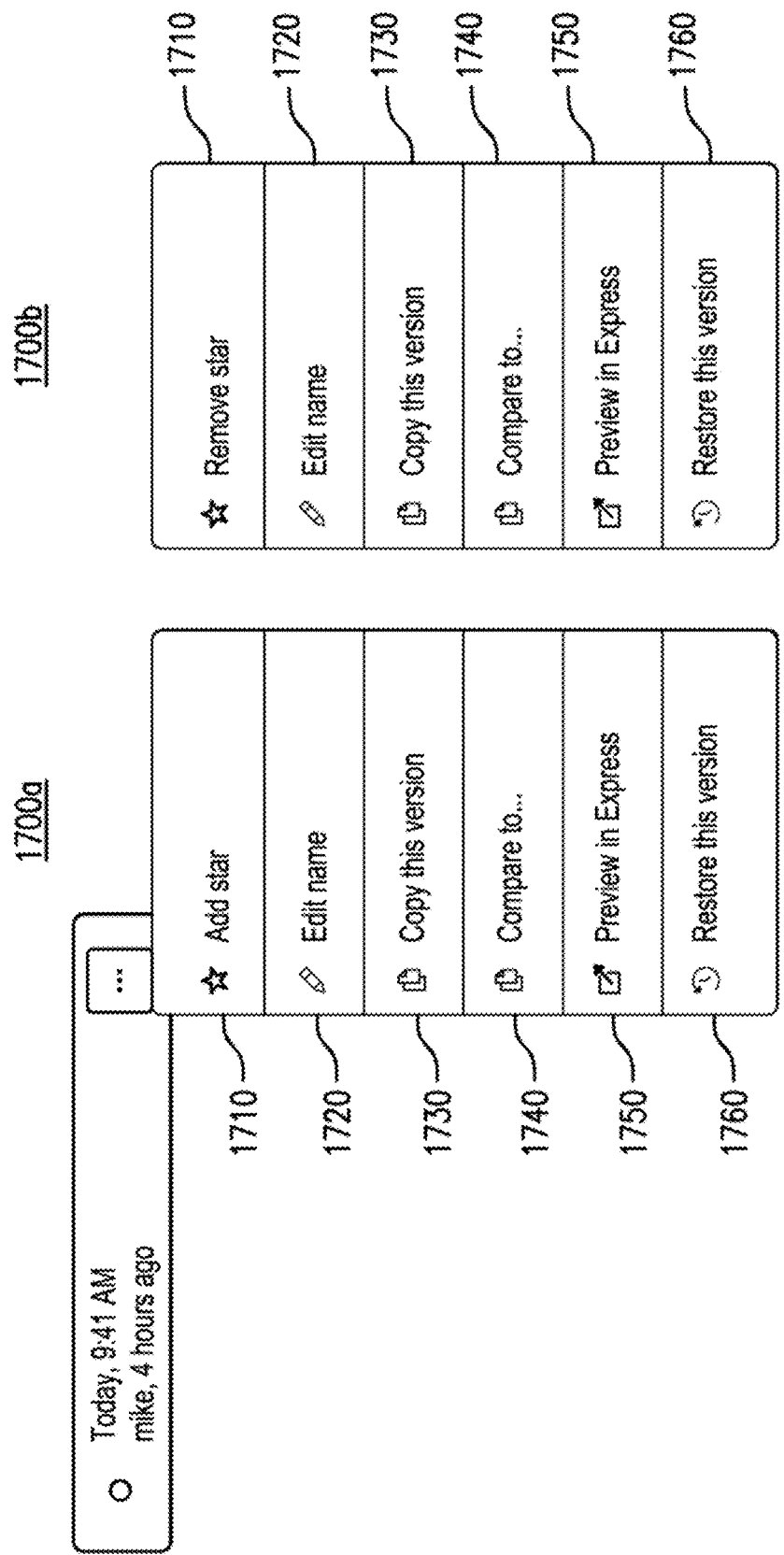
FIG. 17 illustrates exemplary menus that may be displayed in connection with implementing a version control component in accordance with certain embodiments.

FIG. 17 illustrates exemplary menus 1700*a* and 1700*b* that may be displayed in accordance with certain embodiments. In certain embodiments, the menus 1700*a* and 1700*b* may be displayed in response to a selection of a menu option 1705 included in each of the entries in the version history timeline 260. The menus 1700*a* and 1700*b* include selectable options that can enable a user to perform various actions associated with each of the entries 261 included in the version history timeline 260 for the electronic form 155. The same menu may be displayed to perform various actions associated with each of the entries 261 included in version history timelines 260 for other form components 211 (e.g., such as template components, transform components, workflow components, data models, etc.) that are stored and managed by the version control component 250.

With respect to menu 1700*a*, a first option 1710 enables a user to add or associate a star indicator 262*c* to a corresponding entry 261 or version 280 of the electronic form 155. If a star indicator 262*c* is already assigned to a corresponding entry or version 280, the first option 1710 may enable removal of the star indicator 262*c* as shown in menu 1700*b*.

A second option 1720 enables a user to add, edit, and/or delete a name or title of a corresponding entry 261 or version 280 of the electronic form 155. Naming or titling the various entries 261 or versions 280 can be very useful for managing and tracking multiple versions of the electronic form 155.

A third option 1730 enables a user to copy a version 280 of an electronic form 155. For example, a user may wish to copy an archived version 280 to be utilized as a starting point for creating a new updated version 280 of the electronic form 155.

A fourth option 1740 enables a user to compare a version 280 of a corresponding entry 261 to one or more additional versions 280 of the electronic form 280. As explained in further detail below, the changes or revisions between or among the versions 280 selected for comparison may be displayed in a comparison mode 275 which visually depicts the changes or revisions.

A fifth option 1750 enables a version 280 associated with a corresponding entry 261 to be accessed, previewed and/or viewed on an interface. The interface may display the version of the electronic form 155 in a manner that would be provided to an end-user who utilizes the electronic form 155 to enter information in carrying out business activities, and/or may be displayed in a manner that allows a form builder to view, access, and/or edit settings associated with the electronic form 155.

A sixth option 1760 enables a version 280 associated with a corresponding entry 261 to be restored as the current version of the electronic form 155. Selection of the sixth option 1760 may append a new version of the electronic form 155 to the version history timeline 260 with a restore indicator 262*a*. In some cases, this option 1760 may be selected to restore a previously functional version 280 of an electronic form 155 in the event that updates incorporated in other versions 280 have resulted in failures or malfunctions. In other cases, this option 1760 may be selected to restore a previously functional version 280 of an electronic form 155 as a starting point for creating a revised version of an electronic form 155 for use in a particular third-party system 130.

FIG. 18 is an exemplary interface 1800 that may be displayed in connection with performing a restore operation in accordance with certain embodiments. In certain embodiments, this interface may be displayed in response to selecting the sixth option 1760 on menu 1700*a* or 1700*b* illustrated in FIG. 17. The same or similar interfaces may be displayed to customize the manner in which versions 280 of other form components 211 (e.g., such as template components, transform components, workflow components, data models, etc.) are restored by the version control component 250.

Performing a restore operation may cause a selected version 280 of an electronic form 155 (e.g., which may be selected from a version history timeline 260) to be the current version of the electronic form 155. The interface 1800 enables a user to select options 1820 for customizing the name and/or title of the new version 280 that is being created, as well as for adding comments pertaining to the new version 280. Additionally, a menu 1810 includes selectable options that permit the user to customize the components, settings, and features that will be incorporated into the current version 280 from the previously stored version 280. The default settings for performing a restore operation may cause the current version 280 being created to incorporate the form components 211 (e.g., layout components, 311, input field components 312, etc.), configuration settings (e.g., specified by customization interfaces associated with the form components 211), title, and path from the previous version which is selected to be restored, while not incorporating certain features such as changes to associated transforms and reference data. The user may change or alter the default settings (e.g., by selecting/unselecting the checkmarks and/or X's adjacent to these settings) to customize the current version being restored. Once a user is finished editing the settings, a submit option 1830 may be selected to create a new restored version 280 that based on the selected settings.

Similar interfaces may be displayed in connection with performing restore operations on other types of form components (e.g., templates, workflows, transforms, data models, etc.) that are managed by the version control component 250.

Figure 15:
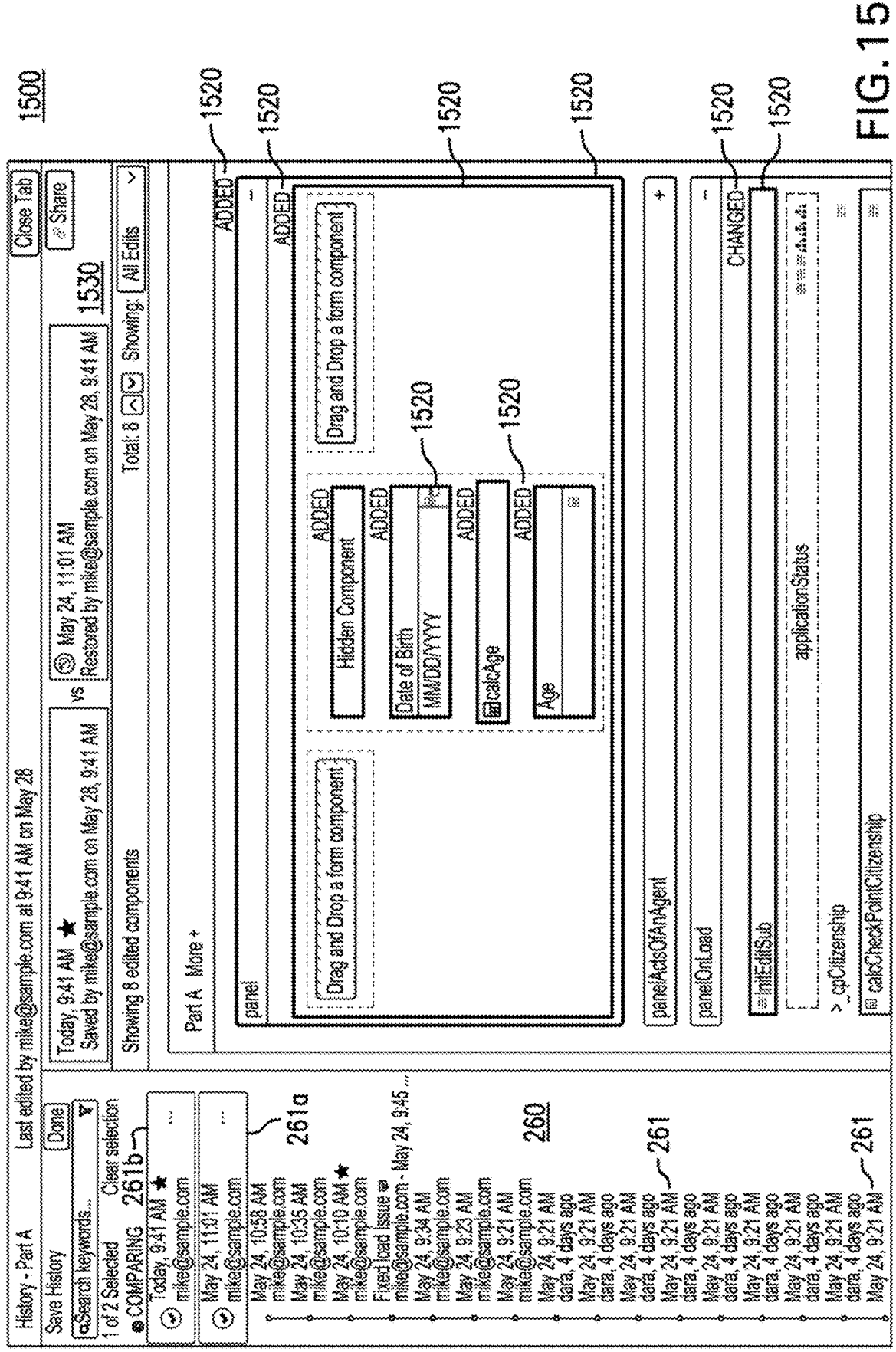
FIG. 15 is an interface that illustrates a development window configured in a comparison mode in accordance with certain embodiments.

FIG. 15 is an exemplary interface 1500 demonstrating an exemplary comparison function 270 in accordance with certain embodiments. The comparison function 270 may be initiated by selecting a menu option (e.g., option 1740 in FIG. 17) corresponding to an entry 261 included in the version history timeline 260. In this exemplary interface, two entries 261*a* and 261*b* in the version history timeline 260 are selected for comparison. A comparison header 1530 displays details of the two versions of the electronic form 155 that are being compared (e.g., including details identifying who created the versions and when they were created). The development window 330 is configured in a comparison mode 275 that identifies the differences between the two versions 280 associated with the corresponding to the selected entries.

The differences or revisions between the two selected versions 280 of the electronic form can be shown relative to one of the selected versions 280. For example, the comparison function 170 may designate one selected version of the electronic form 155 as a "first version" and may designate the later version of the electronic form as a "second version," while the differences between the versions (e.g., which are identified visually in the development window 330) are identified relative to the first version of the electronic form 155. The changes or differences may indicate whether form components 211 (e.g., such as layout components 311, input field components 312, etc.) are added, deleted, and/or edited relative to the first version of the electronic form 155.

In certain embodiments, the first version of the electronic form 155 may refer to the version which was created first in time, while the "second version" of the electronic form may version that was created later in time. Alternatively, or additionally, the user who initiates the comparison function 170 may designate which version should be considered the first and second versions, thus enabling the user to control how changes or revisions are illustrated in the development window 330 relative to the two versions. Thus, the terms "first version" and "second version" are not intended to imply a chronological order in which the versions are created. In some examples, the "first version" may relate to a version of an electronic form that was created after the "second version."

Upon selection of the two versions 280 for comparison, the development window 330 may operate in a comparison mode 275 that displays the electronic form 155 with one or more visual indicators 1520. Each visual indicator 1520 may represent an identifier, graphic, symbol, and/or annotation that identifies, denotes, and/or highlights a change or revision. Exemplary visual indicators 1520 may be implemented using one or more of: a box annotation that surrounds or identifies a form component or setting that has been changed or revised; text that identifies or describes a change or revision to a form component or setting; a bubble or annotation that identifies a form component or setting that has been changed or revised; a change in color of a form component or setting that has been changed or revised; highlighting that identifies a form component or setting that has been changed or revised; and/or any other indicator that can be displayed to visually identify or highlight a change or revision. In certain embodiments, the development window 330 displays the electronic form 155 in a WYSIWYG format which incorporates one or more of the above-identified visual indicators 1520.

In the exemplary interface of FIG. 15, the visual indicators 1520 include bolded lines surrounding components that have been added, deleted, and/or edited. For example, certain input field components 312 and application components 313 (e.g., labeled "Hidden Component," "Date of Birth," "calcAge," and "Age"), as well as advanced control components 315 (e.g., labeled "InitEdSub"), are highlighted in bold lines which surround these components. In certain embodiments, the bolded lines may also be highlighted in a particular color which aids in their identification. The visual indicators 1520 also include text annotations describing the type of change that applies to each revision (see "ADDED" and "CHANGED"). Other types of visual indicators 1520 may be displayed to identify revisions or changes between the two selected versions 280 of the electronic form 155.

As mentioned above, a user may utilize one or more configuration interfaces to customize form components that are inserted into a version 280 of an electronic form 155. When operating in the comparison mode 275, the customization interfaces may be accessed by selecting corresponding form components 211 that are displayed in the development window 330. As discussed below with reference to FIGS. 16A-16C, the customization interfaces also may be annotated with visual indicators 1520 to identify changes to any settings of the customization interfaces across different versions 380 of the electronic form 155.

In certain embodiments, the comparison function 170 can be configured to compare more than two versions 280 of an electronic form 155 and display changes or revisions among the versions in the comparison mode 275. For example, a user may select three or more entries 261 in the version history timeline 260 for comparison, and the development window 330 may display all of the changes relative to one of the selected versions 280. In some cases, the visual indicators 1520 may indicate which version the changes are relative to (e.g., by providing text or other annotations indicating that a component or setting of the electronic form has changed relative to one of or both of the other two selected versions). For example, the visual indicators 1520 may indicate that a form component (e.g. an input field component 312) was added in one version created on a first date, edited in a second version created on a later dated, and deleted in a third version created on an even further date.

Figure 23:
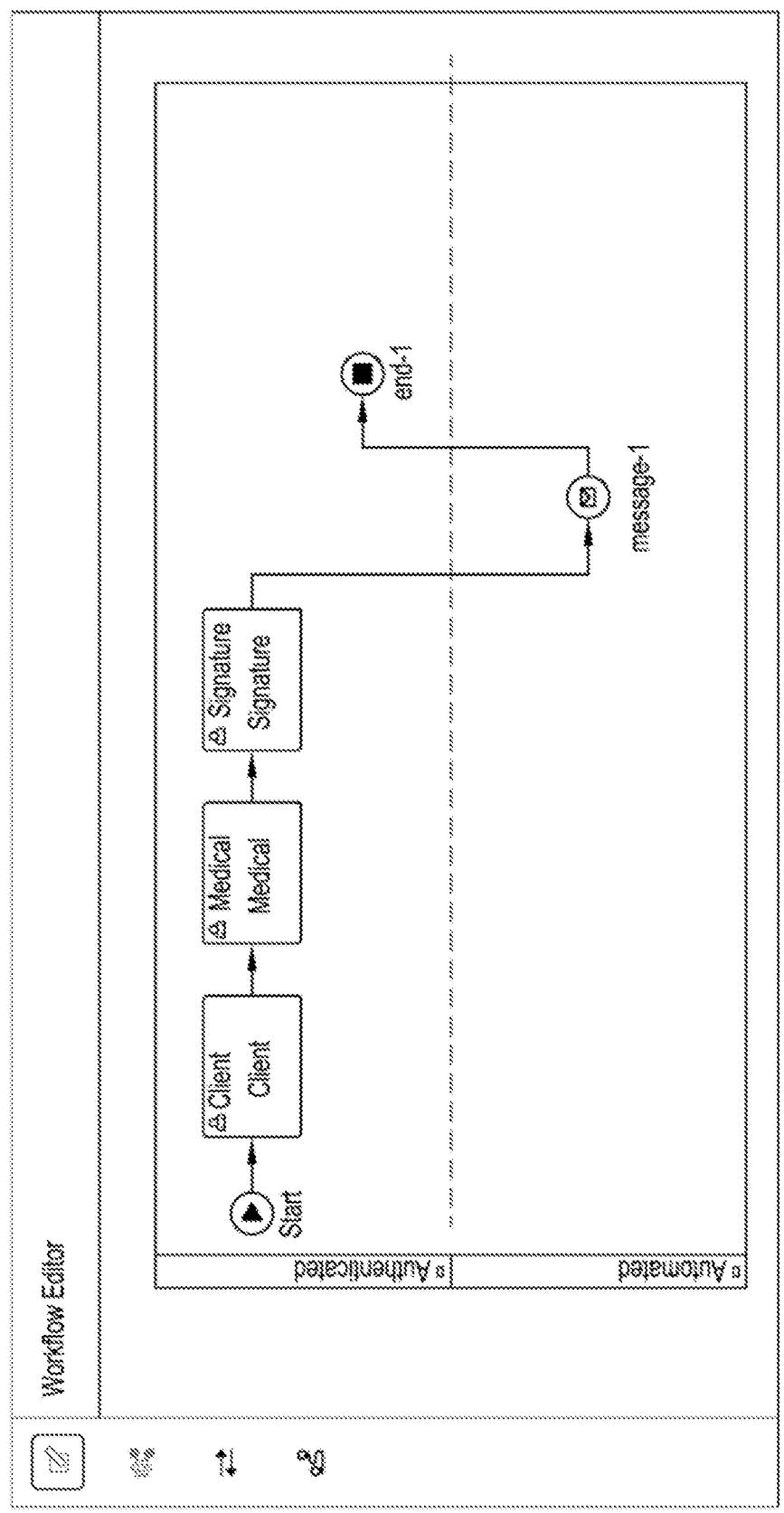
FIG. 23 is an interface that illustrates a development window associated with a workflow component configured in a comparison mode.

The version control component 250 may display comparisons for other types of form components 211 (e.g., such as template components, transform components, workflow components, etc.) in a similar fashion and using similar visual indicators 1520. Corresponding interfaces for these components can be configured to display changes between or among versions in a comparison mode 275 that utilizes visual indicators 1520 to identify changes or revisions between separate versions 280 of these components. FIG. 23, which is discussed in further detail below, provides an example of an interface that is configured in a comparison mode 275 for a workflow component.

Figure 16A:
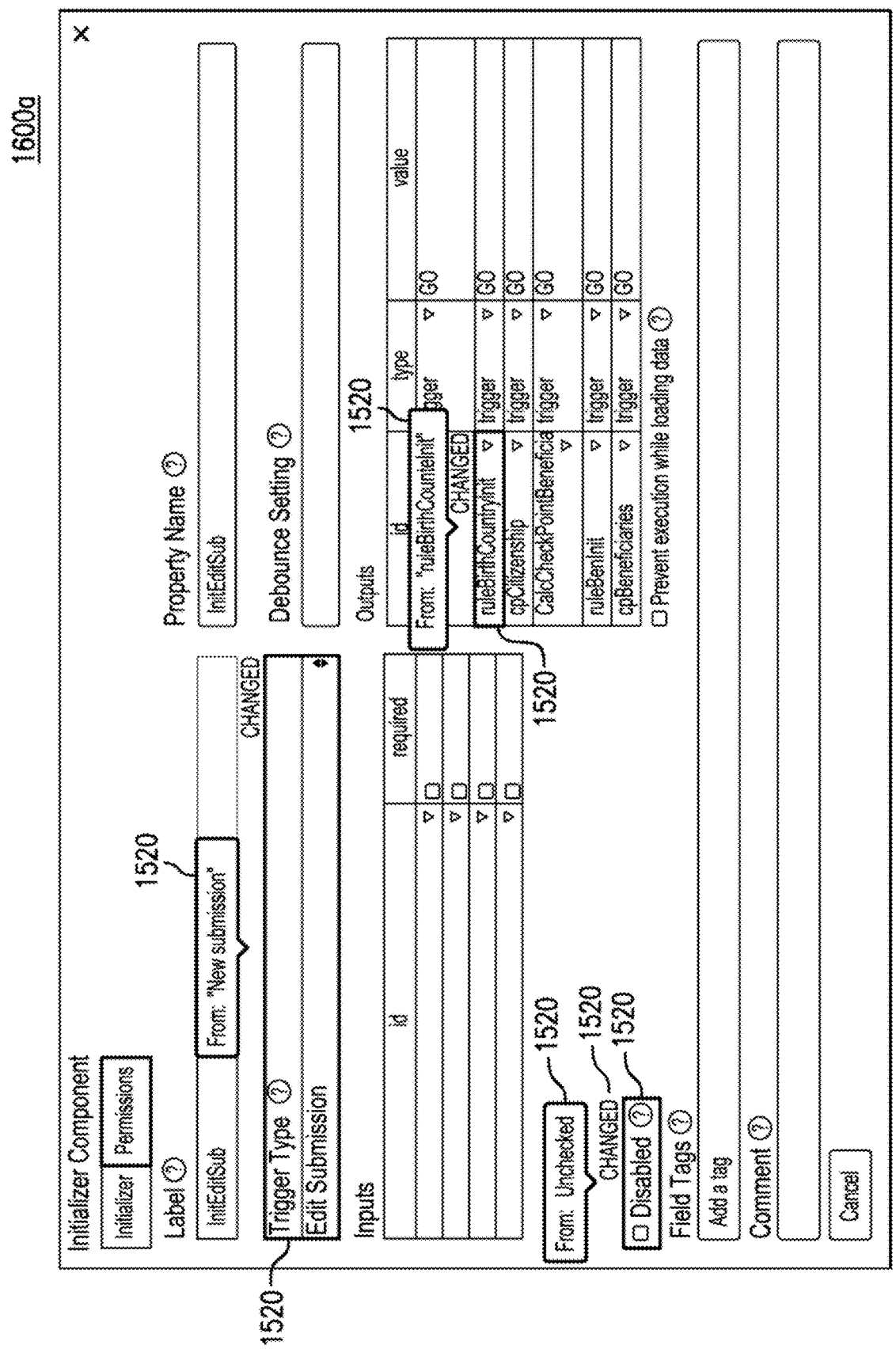
FIG. 16A is an exemplary customization interface configured in a comparison mode in accordance with certain embodiments.
Figure 16C:
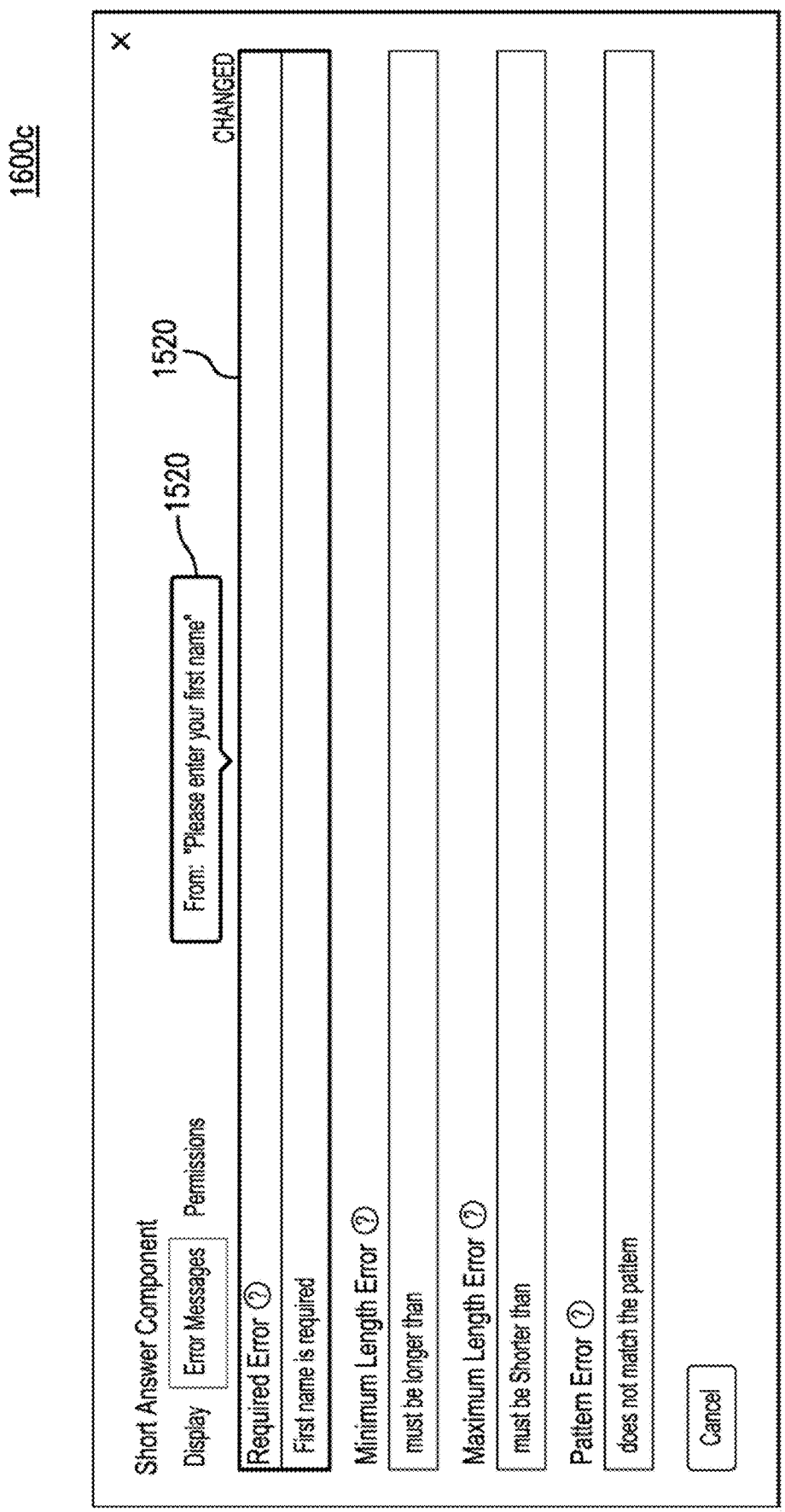
FIG. 16C is another exemplary customization interface that is configured in a comparison mode in accordance with certain embodiments.

FIGS. 16A-16C are exemplary customization interfaces (1600A, 1600B, 1600C) that identify changes between versions 280 of an electronic form 155 in a comparison mode 275 in accordance with certain embodiments. FIGS. 16A-16B are exemplary customization interfaces that may be displayed in response to a user selecting one of the form components (e.g., the component labeled "InitEdSub" in FIG. 15) from the development window 330 in a comparison mode 275. FIG. 16C is an exemplary customization interface that may be displayed in response to selecting an input field component 312 (e.g., a short answer input field component) from a development window 330 configured in the comparison mode 275. Other configuration interfaces (e.g., such as those illustrated in FIGS. 4-8 and 9A-9B) can be annotated in a similar manner to identify changes between or among versions in a comparison mode 275.

Each of the customization interfaces in FIGS. 16A-C includes visual indicators 1520 that identify changes in configurations or settings across different versions of an electronic form 155. The visual indicators 1520 again include bolded lines and text which allow for easy identification of changes across the versions 280. Here, the visual indicators 1520 also include pop-up annotations or text bubbles that identify the previous settings that were specified for the customization interfaces. For example, in FIG. 16A, the visual indicators 1520 show that an output setting was changed from "ruleBirthCountyInit" to "ruleBirthCountryInit", a checkbox value was changed from "unchecked" to "checked", and a trigger value was changed from "New Submission" to "Edit Submission." Similar visual indicators 1520 are included in FIGS. 16A-B to demonstrate other settings that have been changed on these customization interfaces.

Figure 19:
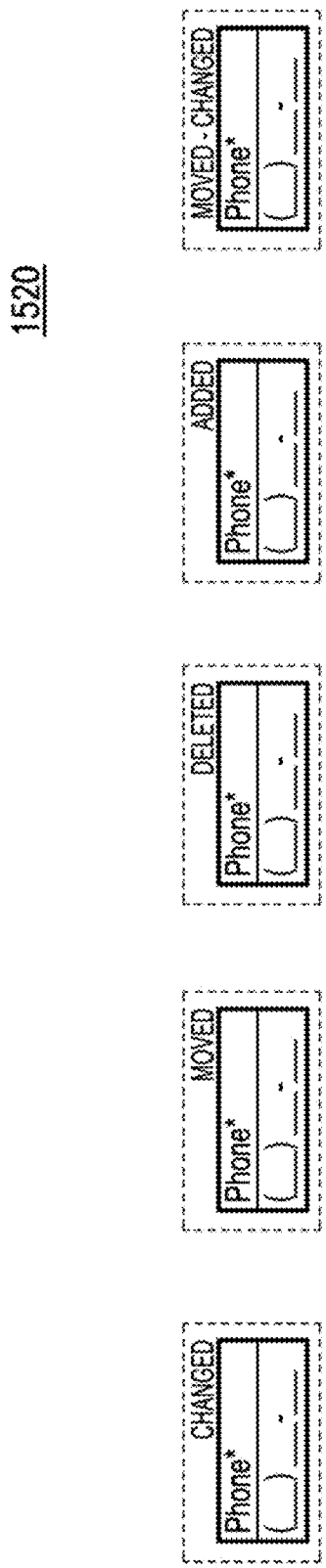
FIG. 19 illustrates exemplary visual indicators associated with implementing a comparison function in accordance with certain embodiments.

FIG. 19 illustrates exemplary visual indicators 1520 associated with implementing a comparison function 270 in accordance with certain embodiments. As explained above, the visual indicators 1520 may be displayed on an interface (e.g., in development window 330 and/or on one or more customization interfaces) configured in a comparison mode 275 that illustrates changes between or among different versions of electronic forms and/or other form components.

In this figure, the visual indicators 1520 are displayed in connection with an input field component 312 (e.g., an input field for collecting a telephone number). The same or similar visual indicators 1520 can be displayed in connection with any other form components 211 (e.g., such as layout components 311, application components 313, template components 314, advanced control components 315, workflows, transforms, etc.) and/or settings described herein.

In each of the five illustrated examples, the form component is highlighted using visual indicators 1520 that include bolded lines, broken line annotation boxes, and text describing the corresponding changes. In certain embodiments, the bolded lines and/or annotation boxes may also be highlighted in particular colors to draw attention to these components when they are displayed in the comparison mode 275 on an interface to a form builder who is trying to identify the changes among two or more versions 280 of an electronic form 155. As shown, the text describing the change may indicate to a form builder that the component was added, deleted, changed/revised (e.g., the input field and/or configuration settings corresponding to the component were changed or revised), moved (e.g., the location of the component within the form was moved), and/or a combination of thereof.

Figure 20:
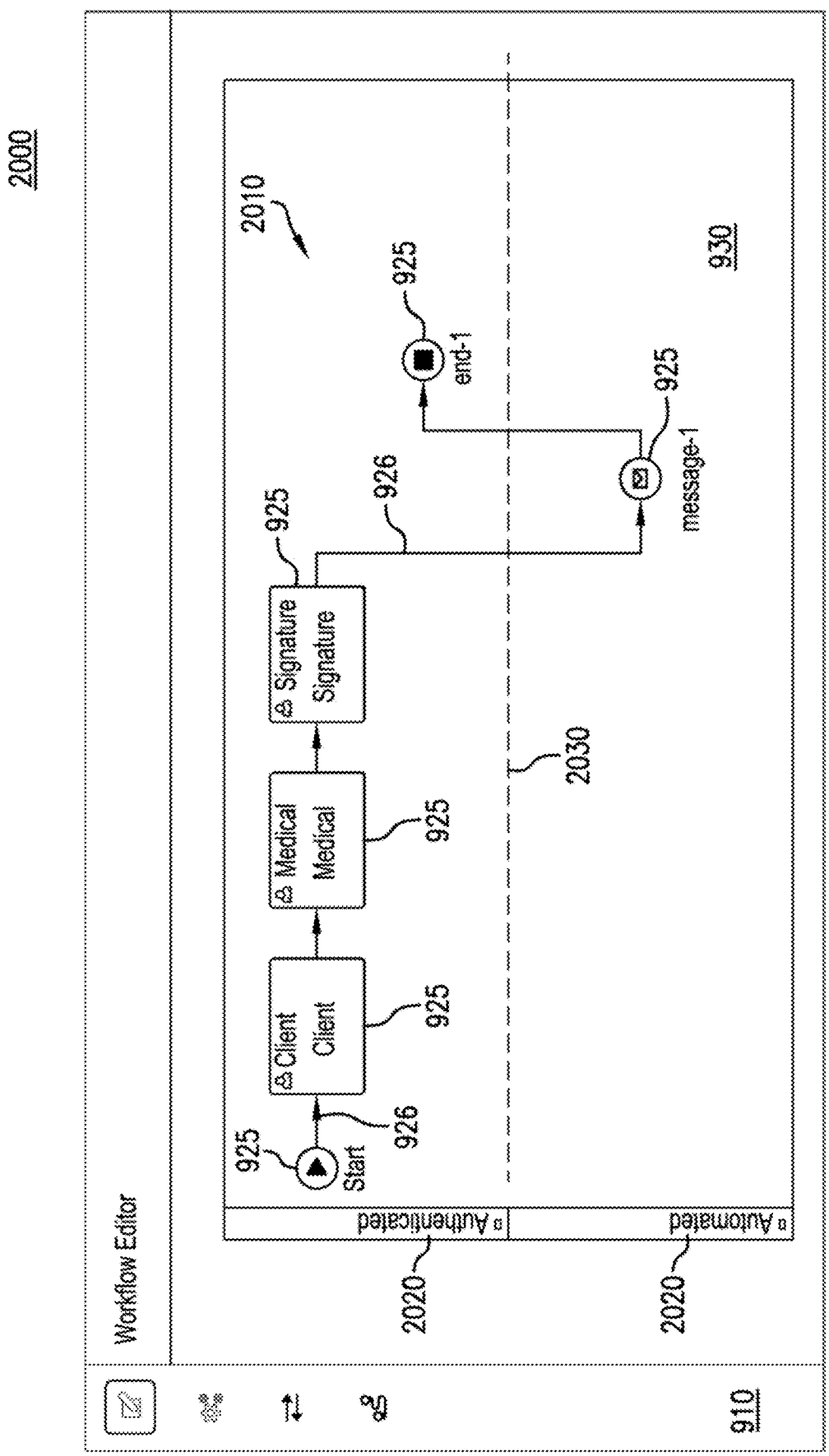
FIG. 20 is an exemplary interface that may be displayed in connection with creating or updating a workflow in accordance with certain embodiments.
Figure 21:
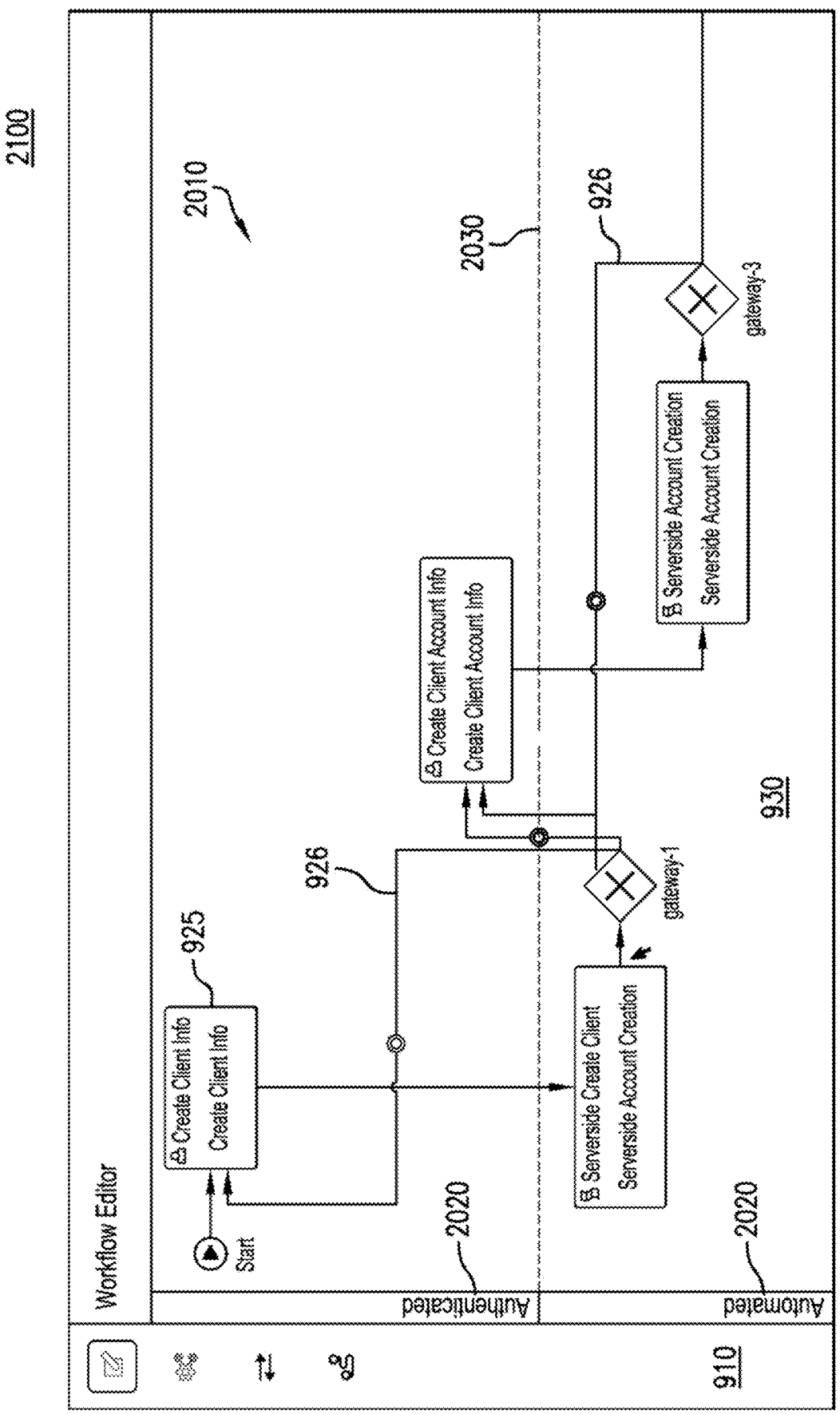
FIG. 21 is an exemplary interface that may be displayed in connection with creating or updating a workflow in accordance with certain embodiments.

FIGS. 20-21 are exemplary interfaces 2000 and 2100 for creating and/or updating workflows 2010 according to certain embodiments. In these exemplary interfaces, the workflows 2010 can be defined in a manner that allocates portions of the workflows 2010 to be performed by specific individuals, entities, and/or devices based on assigned roles. On each of these interfaces, a diagram development window 930 is used to define a workflow 2010 that is being created or updated. As described above, the workflows 2010 can be defined by selecting, inserting (e.g., dragging-and-dropping), and customizing nodes 925 and connections 926 to create a node diagram 920 in the diagram development window 930, and the workflow 2010 associated with the node diagram 920 can be integrated into one or more electronic forms 155 to provide enhanced control and functionality for the one or more electronic forms 155.

In creating a node diagram 920 for defining a workflow 2010, a user can also provide inputs for defining roles 2020, and assigning functions associated with a workflow 2010 to be performed by individuals, entities, and/or devices associated with the particular roles 2020. For example, a user can create a workflow 2010 that assigns the functions associated with each node 925 to be performed by individuals, entities, and/or devices associated with the particular roles 2020.

Exemplary roles may include:

(1) Customer Role: This role 2020 may be associated with, and performed by, individuals or customers who access deployed electronic forms 155, or portions thereof, in connection with particular products or services. For example, a third-party system 130 may deploy an electronic form 155 in connection with a particular product or service (e.g., an insurance product or service). Customers may access an electronic form 155 that is deployed publically (e.g., via a website) by the third-party system 130 to provide and/or obtain information associated with the product or service. One or more nodes 925 included in workflows 2010 for these electronic forms 155 may enable or require the customers to provide information and/or perform certain functions by associating a customer role with the one or more nodes 925.

(2) Back-end User Role: This role 2020 may be associated with, and performed by, individuals who execute or perform certain tasks and functions for a third-party system 130 and/or an entity that hosts of the development and deployment platform 150. For example, a third-party system 130 that offers insurance products may designate back-end user roles to brokers, underwriters, form builders, and/or other persons. Likewise, a development and deployment platform 150 may designate back-end user roles for form builders, administrators, and/or other persons who assist third-party systems with creating and/or deploying electronic forms 155. One or more nodes 925 included in the workflows 2010 for the electronic forms 155 may enable or require these individuals to provide information and/or perform certain functions in connection with carrying out the workflows 2010.

(3) Automated Role: This role 2020 may be associated with, and performed by, devices (e.g., servers 120 and/or computing devices 110) that execute processes in the background of electronic forms 155. For example, in response to receiving information from customers and/or back-end users, these devices may automatically process the received information and/or perform various functions associated with the electronic forms 155. One or more nodes 925 included in the workflows 2010 for the electronic forms 155 may enable or require these devices to process certain information and/or perform certain functions in connection with carrying out a workflow 2010.

Each of the above roles 2020 may be created or defined using options included on a menu 910 and/or by other functions made available via the development and deployment platform 150. It should be recognized that that additional roles 2020 may be created or defined, and incorporated into workflows 2010 other than those described above.

In certain embodiments, role division lines 2030 may be inserted into the node diagrams 920 that define the workflows 2010. The role division lines 2030 can be inserted into the node diagrams 920 by selecting options on a menu 910. The role division lines 2030 can be utilized to assign the functions associated with each of the nodes 925 to one or more particular roles 2020. For example, the role division lines 2030 can be utilized to specify which roles 2020 are able or required to perform certain functions associated with each of the nodes 925 included in a workflow 2010 and/or to allocate permissions to such roles 202 to perform such functions.

In FIGS. 20 and 21, a role division line 2030 segments workflows 2010 between two different roles 2020. The functions associated with the nodes 925 included in the top section of the diagram development window 930 (located above the role division line 2030) are allocated to be performed by one or more individuals who are capable of performing a first role 2020 (e.g., a customer role and/or back-end user role which is labeled "authenticated"). For example, this may involve one or more particular individuals (e.g., customers, brokers, and/or underwriters) supplying information via a deployed electronic form 155 and/or executing certain functions to complete a particular portion of the electronic form 155. The functions associated with the nodes 925 included in the bottom section of the diagram development window 930 (located below the role division line 2030) are allocated to devices that are capable of performing a second role 2020 (e.g., an automated role which labeled "automated").

In other more complex workflows 2010, multiple role division lines 2030 may be included in each workflow 2010 to allocate functions associated with the workflow nodes 925 among many different roles 2020. For example, functions associated with a workflow 2010 may be divided among four roles 2020 including a customer role, a first back-end user role (e.g., associated with a broker), a second back-end user role (e.g., associated with an underwriter), and an automated role. In this scenario, the diagram development window 930 can be divided into four separate sections using role division lines 2030, and each of the sections can be associated with one of the roles 2020. Inserting or including a node 925 into a particular section indicates that the corresponding function of the node 925 is to be performed by an individual and/or device that is associated with the role 2020.

To illustrate by way of further example, consider an electronic form 155 that is deployed (e.g., by a third party system 130) to collect information for an insurance product. In this scenario, a workflow 2010 for the electronic form 155 may specify that particular subsets of information should be supplied from each of a plurality of individuals. To facilitate such, nodes 925 may be incorporated into the workflow 2010 for collecting the information, and a plurality of role division lines 2030 may be incorporated into the workflow 1020 to designate these functions to particular roles 2020. For example, in connection with executing a workflow 2010, one subset of information may be collected via a form interface from a customer (e.g., a first role 2020) of the insurance product, a second subset of information may collected via a form interface from by a broker (e.g., a second role 2020) of the insurance product, and a third subset of information may be collected via a form interface from by an underwriter (e.g., a third role 2020) of the insurance product. The workflow 2010 can include separate nodes 925 for collecting each subset of information, and the connections 926 between the nodes 925 can control the sequence in which each subsets of information are collected. Additionally, role division lines 2030 can be inserted into the workflow 2010 to identify each individual or role 2020 that is capable of supplying the various subsets of information.

Staying with the above example, the workflow 2010 associated with electronic form 155 may also specify that certain functions are to be performed by a server or computing device in the background during execution of the workflow 2010. For example, during the workflow 2010, the server or computing device may transmit confirmation e-mails, create or edit account information, verify information, execute transform operations on received data, update databases, and/or perform other processing operations. In this scenario, the role division lines 2030 can allocate these functions to the server or computing device as a separate role 2020 to be performed by these devices. Thus, roles 2020 may be assigned to devices to perform certain functions automatically, as well as to specific individuals to perform certain functions and/or supply information.

As mentioned above, the version control component 250 can be configured to perform various functions associated with the managing multiple versions 280 of workflow components (as well as other form components). For example, the version control component 250, inter alia, can perform functions associated with storing or archiving multiple versions 280 of workflows 2010, accessing or viewing to the stored workflows 2010, and/or executing comparison functions 270 for comparing stored versions 280 of the workflows 2010. Any of the functionality of the version control component 250 described above with respect to managing multiple versions of electronic forms 155 can also be applied to manage multiple versions of workflows 2010 and/or other form components 211.

FIG. 23 is an exemplary interface 2300 that demonstrates how the version control component 250 can be applied to workflows 2010 and/or workflow components. Similar to the interfaces illustrated in FIGS. 13 and 15, a version history timeline 260 can include a listing of entries 261, each of which corresponds to a stored version 280 of a workflow 2010 (and/or which corresponds to a stored version 280 of a node diagram 920 that defines the workflow 2010). As explained above, various indicators (e.g., restore indicators 262a, promotion indicators 262b, star indicators 262c, and comment indicators 262d) and labels can be assigned to the entries 261. The entries 261 in the version history timeline 260 can be selected to access or view the stored versions 280. In response to selecting an entry 261, the diagram development window 930 can be updated to display a corresponding workflow 2010 and/or node diagram 920.

Moreover, as discussed above, the diagram development window 930 associated with a workflow component can be configured in a comparison mode 275 and can display visual indicators 1520 showing changes and/or revisions between or among two or more versions 270 of a workflow 2010. The visual indicators 1520 identify nodes 925, connectors 926, and/or other aspects of the workflows 1020 that have been. The nodes, connectors and/or other features associated with the workflows 2010 may be selected to access customization interfaces, and visual indicators 1520 may be included on such interfaces to identify any changes in the settings.

In this example, the visual indicators identify a transform component 2350 and associated connectors have been inserted into a workflow 2010. As described above, the transform components 2350 may perform functions for transforming and/or manipulating inputs that are received via an electronic form. For example, a user may design a transform component 2350 using one or more interfaces that accessible via the development platform 150, and that transform component 2350 may be inserted into electronic forms either directly (e.g., via development window 330) or by including the transform component 2350 in workflows 2010 that are associated with the electronic forms 155. As with any other form component 211 described herein, multiple versions of the transform component 2350 can be saved and/or archived, and the version control component 250 can enable various functions (e.g., viewing, accessing, comparing, restoring, etc.) to be performed in connection with the versions.

Figure 22:
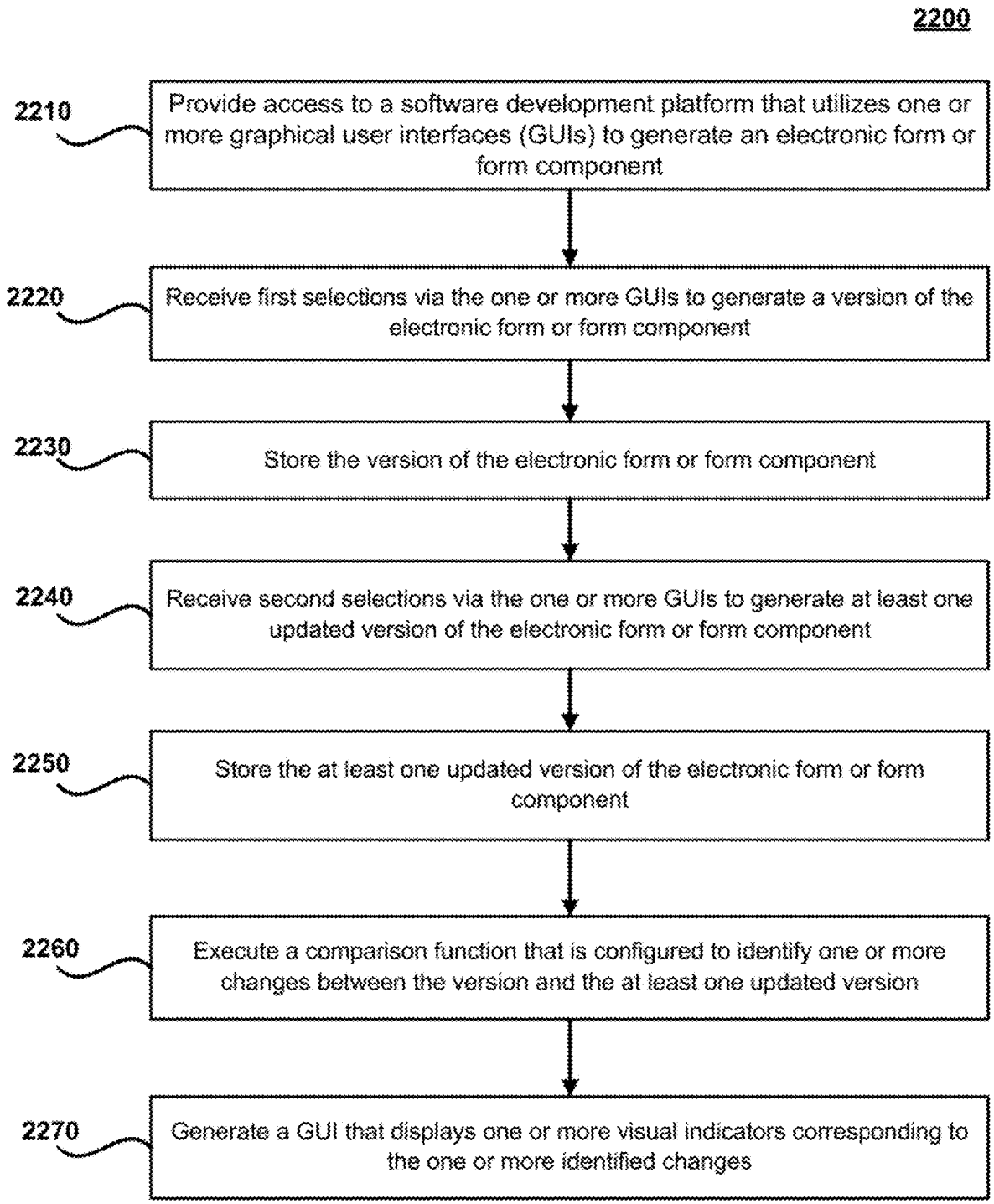
FIG. 22 is a flow chart of an exemplary method for implementing version control of an electronic form in accordance with certain embodiments.

FIG. 22 is a flow chart of an exemplary method 2200 for implementing version control of an electronic form or associated form component in accordance with certain embodiments. Method 2200 is merely exemplary and is not limited to the embodiments presented herein. Method 2200 can be employed in many different embodiments or examples not specifically depicted or described herein. In some embodiments, the steps of method 2200 can be performed in the order presented. In other embodiments, the steps of method 2200 can be performed in any suitable order. In still other embodiments, one or more of the steps of method 2200 can be combined or skipped. In many embodiments, the development and deployment platform 150 and/or version control component 250 can be suitable to perform method 2200 and/or one or more of the steps of method 2200. In these or other embodiments, one or more of the steps of method 2200 can be implemented as one or more computer instructions configured to run on one or more processing modules (e.g., processor 202) and configured to be stored at one or more non-transitory memory storage modules (e.g., storage device 201). Such non-transitory memory storage modules can be part of a computer system, such as system 100, development and deployment platform 150, computing device 110, server 120, and/or third-party system 130.

In step 2210, access is provided to a software development platform that utilizes one or more graphical user interfaces (GUIs) to generate an electronic form 155 or form component. The software development platform may represent the development and deployment platform 150 described herein. In certain embodiments, a user may access the software development platform over a network 160 and/or directly via a local device. In certain embodiments, the user may utilize a web browser and/or local application to access the platform. The one or more GUIs may include any of the interfaces described in this disclosure. As explained above, the software development platform can be configured to create and/or update various electronic forms 155, as well as various form components 211 that are incorporated and/or utilized by the electronic forms. The form components 211 can include layout components 311, input field components 312, application components 313, templates components 314, advanced control components 315 (e.g., including workflow components, decision components, transform components etc.), data models 290, and/or other related components.

In step 2220, first selections are received via the one or more GUIs to generate a version 280 of the electronic form 155 or form component. The first selections may be received via one or more GUIs (e.g., via a development window included on one or more form generation interfaces 300 and/or 1200) accessible via the development and deployment platform 150 to create and/or update an electronic form 155 (e.g., by specifying and customizing form components to be included in the electronic form). Additionally, or alternatively, the first selections may be received via one or more GUIs (e.g., via a workflow development window 930 included on or more interfaces) accessible via the development and deployment platform 150 to create and/or update a form component 211 (e.g., by specifying fields, settings, diagrams, and/or other aspects of form components). As explained above, the version control component 250 may permit multiple versions of each electronic form 155 and/or form component to be stored or archived. The first selections can be utilized to create either an initial version 280 for the electronic form 155 or form component, or an updated version 280 of the electronic form 155 or form component.

In step 2230, the version 280 of the electronic form 155 or form component is stored. The version control component 250 can store the version 280 of the electronic form 155 or form component in a database (e.g., database 240) and/or on one more storage devices 201. Thereafter, the version 280 of the electronic form 155 or form component may be made available via a corresponding version history timeline 260.

In step 2240, second selections are received via the one or more GUIs to generate at least one updated version of the electronic form or form component. Again, the second selections may be received via one or more GUIs accessible via the development and deployment platform 150 to create and/or update an electronic form 155. Additionally, or alternatively, the second selections may be received via one or more GUIs accessible via the development and deployment platform 150 to create and/or update a form component. The second selections can generate a new version of the electronic form 155 or form component that is different from the version created previously in step 2220. For example, in some embodiments, the at least one updated version 280 of the electronic form or form component can be created by accessing a previously stored version 280 (e.g., the version created in step 220) of the electronic form 155 or form component via a version history timeline 260 and inputting the second selections to modify the previously stored version.

In step 2250, at least one updated version of the electronic form or form component is stored. Again, the version control component 250 can store the at least one updated version of the electronic form 155 or form component in a database (e.g., database 240) and/or on one more storage devices 201. Thereafter, the at least one updated version of the electronic form 155 or form component may be made available via a corresponding version history timeline 260.

In step 2260, a comparison function 270 is executed that is configured to identify one or more changes between the version 280 and the at least one updated version 280. As mentioned above, a user that desires to compare two or more stored versions 280 of an electronic form or form component can access a version history timeline 260 and select the versions 280 that are to be compared. Upon identifying the versions 280 to be compared, the comparison function 270 may be utilized to identify changes between or among two or more stored versions 280 of an electronic form or form component. Exemplary changes may correspond to additions, deletions, and/or edits to various components and/or settings associated with an electronic form 155 and/or form components.

In step 2270, a GUI is generated that displays one or more visual indicators 1520 corresponding to the one or more identified changes. For example, as explained above, an interface may be generated which displays an electronic form or form component in a comparison mode 275. The one or more visual indicators 1520 can include various annotations and/or text that identify or highlight changes between or among the versions 280 that are being compared. Exemplary visual indicators 1520 may include boxes, highlighting, graphics, and/or other annotations that are inserted to identify the changes, and/or text which identifies the type of change (e.g., indicating whether a feature was added, deleted, edited, and/or moved) and content that was changed (e.g., indicating both previous and updated values associated with parameters, variables, and/or settings).

While various novel features of the invention have been shown, described, and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system comprising:
one or more computing devices comprising one or more processors and one or more non-transitory storage devices for storing instructions, wherein execution of the instructions by the one or more processors causes the one or more computing devices to:
provide access to a software development platform that utilizes one or more graphical user interfaces (GUIs) to generate an interface electronic form to receive and process user data, the electronic form comprising one or more drag-and-drop content components to receive user data and one or more drag-and-drop control components to control background actions and processing performed for the user data received through the one or more drag-and-drop content components;
receive first selections via the one or more GUIs to generate a first version of the interface electronic form;
store the first version of the interface electronic form;
receive second selections via the one or more GUIs to generate at least one updated version of the interface electronic form;
store the at least one updated version of the interface electronic form;
execute a comparison function that is configured to identify one or more changes between the first version of the interface electronic form and the at least one updated version of the interface electronic form, including to identify changes between the one or more drag-and-drop control components included in the at least one updated version of the interface electronic form, and a first set of one or more drag-and-drop control components appearing in the first version of the interface electronic form; and
generate one or more visual indicators corresponding to the one or more changes for display on the one or more GUIs.

2. The system of claim 1, wherein:
a version history timeline is included on the one or more GUIs; the version history timeline includes a plurality of entries;
each of the entries included in the version history timeline corresponds to a separately stored version of the electronic form;
the version history timeline displays the plurality of entries in chronological order; and
each of the entries can be selected to access and view a corresponding version of the electronic form.

3. The system of claim 2, wherein:
third selections are received via the one or more GUIs;
the third selections identify at least two versions of the electronic form included in the version history timeline; and
the comparison function analyzes the at least two versions of the electronic form to detect the one or more changes.

4. The system of claim 2, wherein:
at least one of the plurality of entries included in the version history timeline is assigned an indicator that identifies a previous version of the electronic form that has been restored; and
at least one of the plurality of entries included in the version history timeline is assigned an indicator that identifies a version of the electronic form that is properly functioning.

5. The system of claim 1, wherein the one or more visual indicators corresponding to the one or more identified changes are incorporated into the one or more GUIs to identify:
one or more changes to one or more drag-and-drop input field components associated with the electronic form have been added, deleted, or modified;
one or more changes to one or more drag-and-drop layout components associated with the electronic form have been added, deleted, or modified;
one or more changes to one or more drag-and-drop application components associated with the electronic form have been added, deleted, or modified;
one or more changes to one or more drag-and-drop template components associated with the electronic form have been added, deleted, or modified; or
one or more changes to one or more drag-and-drop control components associated with the electronic form have been added, deleted, or modified.

6. The system of claim 1, wherein the one or more visual indicators corresponding to the one or more identified changes are displayed in a comparison mode that identifies the one or more changes, at least in part, by highlighting the one or more changes in a particular color, and appending text that describes the one or more changes.

7. The system of claim 1, wherein:
the version of the electronic form includes one or more components that are configured, at least in part, by specifying settings via one or more customization interfaces;
the second selections modify the settings associated with the one or more customization interfaces;
the one or more customization interfaces can be accessed in the comparison mode; and
the one or more visual indicators identify the settings that are modified on the one or more customization interfaces when the one or more customization interfaces are accessed in the comparison mode.

8. The system of claim 1, wherein:
a version control component is integrated directly into the software development platform and enables access to a version history timeline directly on the one or more GUIs that enable generation of the electronic form;
the version and the at least one updated version are accessible via the version history timeline; and
the version control component enables the comparison function to be executed by selecting one or more options displayed on the one or more GUIs.

9. The system of claim 1, wherein the comparison function configured to identify the one or more changes between the first version of the interface electronic form and the at least one updated version of the interface electronic form is further configured to:
identify changes between customized settings in customization interfaces defining at least one of the one or more drag-and-drop content components and the one or more drag-and-drop control components.

10. A method comprising:
providing, with one or more processors, access to a software development platform that utilizes one or more graphical user interfaces (GUIs) to generate an interface electronic form for receiving and processing user data, the electronic form comprising one or more drag-and-drop content components to receive user data and one or more drag-and-drop control components to control background actions and processing performed for the user data received through the one or more drag-and-drop content components;

receiving first selections via the one or more GUIs to generate a first version of the interface electronic form;

storing the first version of the interface electronic form on one or more non-transitory storage devices;

receiving second selections via the one or more GUIs to generate at least one updated version of the interface electronic form;

storing the at least one updated version of the interface electronic form on the one or more non-transitory storage devices;

executing, with the one or more processors, a comparison function that is configured to identify one or more changes between the first version of the interface electronic form and the at least one updated version of the interface electronic form including to identify changes between the one or more drag-and-drop control components included in the at least one updated version of the interface electronic form, and a first set of one or more drag-and-drop control components appearing in the first version of the interface electronic form; and generating, with the one or more processors, one or more visual indicators corresponding to the one or more changes for display on the one or more GUIs.

11. The method of claim 10, wherein:
a version history timeline is included on the one or more GUIs; the version history timeline includes a plurality of entries;
each of the entries included in the version history timeline corresponds to a separately stored version of the electronic form;
the version history timeline displays the plurality of entries in chronological order; and
each of the entries can be selected to access and view a corresponding version of the electronic form.

12. The method of claim 11, wherein:
third selections are received via the one or more GUIs;
the third selections identify at least two versions of the electronic form included in the version history timeline; and
the comparison function analyzes the at least two versions of the electronic form to detect the one or more changes.

13. The method of claim 11, wherein:
at least one of the plurality of entries included in the version history timeline is assigned an indicator that identifies a previous version of the electronic form that has been restored; and
at least one of the plurality of entries included in the version history timeline is assigned an indicator that identifies a version of the electronic form that is properly functioning.

14. The method of claim 10, wherein the one or more visual indicators corresponding to the one or more identified changes are incorporated into the one or more GUIs to identify:
one or more changes to one or more drag-and-drop input field components associated with the electronic form have been added, deleted, or modified;
one or more changes to one or more drag-and-drop layout components associated with the electronic form have been added, deleted, or modified;
one or more changes to one or more drag-and-drop application components associated with the electronic form have been added, deleted, or modified;
one or more changes to one or more drag-and-drop template components associated with the electronic form have been added, deleted, or modified; or
one or more changes to one or more drag-and-drop control components associated with the electronic form have been added, deleted, or modified.

15. The method of claim 10, wherein the one or more visual indicators corresponding to the one or more identified changes are displayed in a comparison mode that identifies the one or more changes, at least in part, by highlighting the one or more changes in a particular color, and appending text that describes the one or more changes.

16. The method of claim 10, wherein:
the version of the electronic form includes one or more components that are configured, at least in part, by specifying settings via one or more customization interfaces;
the second selections modify the settings associated with the one or more customization interfaces;
the one or more customization interfaces can be accessed in the comparison mode; and
the one or more visual indicators identify the settings that are modified on the one or more customization interfaces when the one or more customization interfaces are accessed in the comparison mode.

17. The method of claim 10, wherein:
a version control component is integrated directly into the software development platform and enables access to a version history timeline directly on the one or more GUIs that enable generation of the electronic form;
the version and the at least one updated version are accessible via the version history timeline; and
the version control component enables the comparison function to be executed by selecting one or more options displayed on the one or more GUIs.

18. A system comprising:
one or more computing devices comprising one or more processors and one or more non-transitory storage devices for storing instructions, wherein execution of the instructions by the one or more processors causes the one or more computing devices to:
provide access to a software development platform that utilizes one or more graphical user interfaces (GUIs) to generate an interface electronic form or form component for receiving and processing user data, the interface electronic form comprising one or more drag-and-drop content components to receive user data and one or more drag-and-drop control components to control background actions and processing performed for the user data received through the one or more drag-and-drop content components;
receive first selections via the one or more GUIs to generate a first version of the interface electronic form or the form component;
store the first version of the interface electronic form or the form component;
receive second selections via the one or more GUIs to generate at least one updated version of the interface electronic form or the form component;
store the at least one updated version of the interface electronic form or the form component;
execute a comparison function that is configured to identify one or more changes between the version of the interface electronic form or the form component, and the at least one updated version of the interface electronic form or the form component, including to identify changes between the one or more drag-and-drop control components included in the at least one updated version of the interface electronic form or component form, and a first set of one or more drag-and-drop control components appearing in the first version of the interface electronic form or component form; and generate one or more visual indicators corresponding to the one or more changes for display on the one or more GUIs.

19. The system of claim 18, wherein:

a version history timeline is included on the one or more GUIs; the version history timeline includes a plurality of entries;

each of the entries included in the version history timeline corresponds to a separately stored version of the electronic form or the form component;

the version history timeline displays the plurality of entries in chronological order; and each of the entries can be selected to access and view a corresponding version of the electronic form or the form component.

20. The system of claim 19, wherein:

third selections are received via the one or more GUIs;

the third selections identify at least two versions of the electronic form or the form component included in the version history timeline; and the comparison function analyzes the at least two versions of the electronic form or the form component to detect the one or more changes.

21. The system of claim 19, wherein:

at least one of the plurality of entries included in the version history timeline is assigned an indicator that identifies a previous version of the electronic form or form component that has been restored; and at least one of the plurality of entries included in the version history timeline is assigned an indicator that identifies a version of the electronic form or form component that is properly functioning.

22. A system comprising:

one or more computing devices comprising one or more processors and one or more non-transitory storage devices for storing instructions, wherein execution of the instructions by the one or more processors causes the one or more computing devices to:

provide access to a software development platform that utilizes one or more graphical user interfaces (GUIs) to generate an interface electronic form for receiving and processing user data, the interface electronic form comprising one or more customizable drag-and-drop components;

receive first selections via the one or more GUIs to generate a first version of the interface electronic form;

store the first version of the interface electronic form;

receive second selections via the one or more GUIs to generate at least one updated version of the interface electronic form;

store the at least one updated version of the interface electronic form;

execute a comparison function that is configured to identify one or more changes between the first version of the interface electronic form and the at least one updated version of the interface electronic form, including to identify changes between customized settings in customization interfaces defining the one or more drag-and-drop components of the interface electronic form; and generate one or more visual indicators corresponding to the one or more changes for display on the one or more GUIs.

* * * * *